United States Patent [19]

Frey et al.

[11] Patent Number: 5,185,871
[45] Date of Patent: Feb. 9, 1993

[54] COORDINATION OF OUT-OF-SEQUENCE FETCHING BETWEEN MULTIPLE PROCESSORS USING RE-EXECUTION OF INSTRUCTIONS

[75] Inventors: Bradly G. Frey, Boca Raton, Fla.; Raymond J. Pedersen, Garrison, N.Y.

[73] Assignee: International Business Machines Corporation, Armonk, N.Y.

[21] Appl. No.: 457,222

[22] Filed: Dec. 26, 1989

[51] Int. Cl.$^5$ .................... G06F 11/00; G06F 11/28
[52] U.S. Cl. .................... 395/375; 364/262.4; 364/262.9; 364/265.6; 364/DIG. 1; 364/944.6; 364/945.1
[58] Field of Search ................ 395/800, 375

[56] References Cited

U.S. PATENT DOCUMENTS

| | | | |
|---|---|---|---|
| 3,781,814 | 12/1973 | Deerfield | 395/375 |
| 3,928,857 | 12/1975 | Carter et al. | 395/250 |
| 4,521,851 | 6/1985 | Trubisky et al. | 364/200 |
| 4,613,935 | 9/1986 | Couleur | 364/200 |
| 4,617,625 | 10/1986 | Nagashima et al. | 364/200 |
| 4,682,281 | 7/1987 | Voffinder et al. | 364/200 |
| 4,731,739 | 3/1988 | Woffinden et al. | 364/200 |
| 4,760,519 | 7/1988 | Papworth et al. | 364/200 |
| 4,791,557 | 12/1988 | Angel et al. | 364/200 |
| 4,872,111 | 10/1989 | Daberkow et al. | 364/200 |
| 4,916,652 | 4/1990 | Schwarz et al. | 364/748 |
| 4,991,090 | 3/1991 | Emma et al. | 364/200 |
| 5,072,364 | 10/1991 | Jardine et al. | 395/375 |
| 5,075,840 | 12/1991 | Grohoski et al. | 395/800 |

*Primary Examiner*—Thomas C. Lee
*Assistant Examiner*—Meng-Ai T. An

*Attorney, Agent, or Firm*—Bernard M. Goldman

[57] ABSTRACT

The disclosure describes means for allowing the sequencing of operand fetches to deviate from the conceptual sequence specified in the program. Allowing fetch sequencing deviations may improve system performance, while not causing any deviation in program execution results. Out-of-sequence (OOS) fetching may be caused by issuing each fetch without regard to the following conditions: 1. a delay in issuance to storage (such as a delay in generating the address for a fetch request); 2. a speed up in operand data return (such as due to fetching the operand data from a store buffer in the execution unit without going to storage for the data); 3. a delay in the return of operand data (such as when a fetch request has a cache miss and its data must be obtained from the storage hierarchy); or 4. an overlap in the return of fetch data for a serializer instruction with execution of instructions preceding the serializer or data and instruction fetching for instructions following the serializer before its completion. Each fetch operand of a serializer is handled as OOS even when it is not OOS in order to eliminate serialized fetching. Operand store compare (OSC) controls are provided to control an OOS fetch dependent on a conceptually prior store operand. If an OOS condition is detected that possibly may have caused wrong data, an execution retry occurs beginning with the currently incomplete instruction stream, and the retry may include OOS fetching. The integrity of data is maintained when an OOS fetch operand is exposed to a cross-invalidation (XI) hit by the storage request of another CPU in a multiprocessor (MP) system.

38 Claims, 16 Drawing Sheets

A. CONCEPTUAL OPERAND SEQUENCE:

```
OPERAND TYPE      F   F   F   F   F   F

IDFO      1   2   3   4   5   6

F=FETCH OPERAND
```

B. EARLY AND LATE FETCH OPERANDS:

```
OPERAND TYPE      F   F   F   F   F   F

IDFO      1   4   3   2   5   6
                      ↑   ↑   ↓
                   ┌──┘   │   └──────────┐
                   │      │              │
                EARLY  EARLY  LATE   EARLY  LATE   LATE
                FETCH  FETCH  FETCH  FETCH  FETCH  FETCH
                re F2  re F3  re F4  re F2  re F3  re F4
```

C. EARLY AND LATE RELATIVE TESTS:

EARLY FETCH TEST:  (IDFO) > FOLLOWING (IDFO)

LATE FETCH TEST:  (IDFO) < PRECEDING (IDFO)

CONCEPTUAL SEQUENCE TEST:  (IDFO) < FOLLOWING (IDFO)
AND
(IDFO) > PRECEDING (IDFO)

Y, Y', X & X' ARE DATA. x & y ARE STORAGE LOCATIONS.
A IS PROGRAM A IN CPU(A).
B IS PROGRAM B IN CPU(B).

FIG. 2

A. CONCEPTUAL OPERAND SEQUENCE:

| OPERAND TYPE | F | F | F | F | F | F |
|---|---|---|---|---|---|---|
| IDFO | 1 | 2 | 3 | 4 | 5 | 6 |

F = FETCH OPERAND

B. EARLY AND LATE FETCH OPERANDS:

| OPERAND TYPE | F | F | F | F | F | F |
|---|---|---|---|---|---|---|
| IDFO | 1 | 4 | 3 | 2 | 5 | 6 |

```
            EARLY    EARLY    LATE     EARLY    LATE     LATE
            FETCH    FETCH    FETCH    FETCH    FETCH    FETCH
            re F2    re F3    re F4    re F2    re F3    re F4
```

C. EARLY AND LATE RELATIVE TESTS:

EARLY FETCH TEST:   (IDFO) > FOLLOWING  (IDFO)

LATE FETCH TEST:    (IDFO) < PRECEDING  (IDFO)

CONCEPTUAL SEQUENCE TEST: (IDFO) < FOLLOWING  (IDFO)
                                AND
                          (IDFO) > PRECEDING  (IDFO)

(OOS BIT ——→1 IF OOS FETCH IS MADE TO THIS CACHE DATA UNIT)

(SET TO IID OR IDFO OF INSTRUCTION HAVING NEWEST OOS FETCH TO THIS CACHE DATA UNIT)

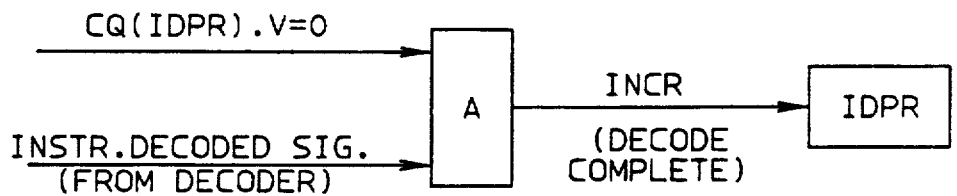
FIG. 21
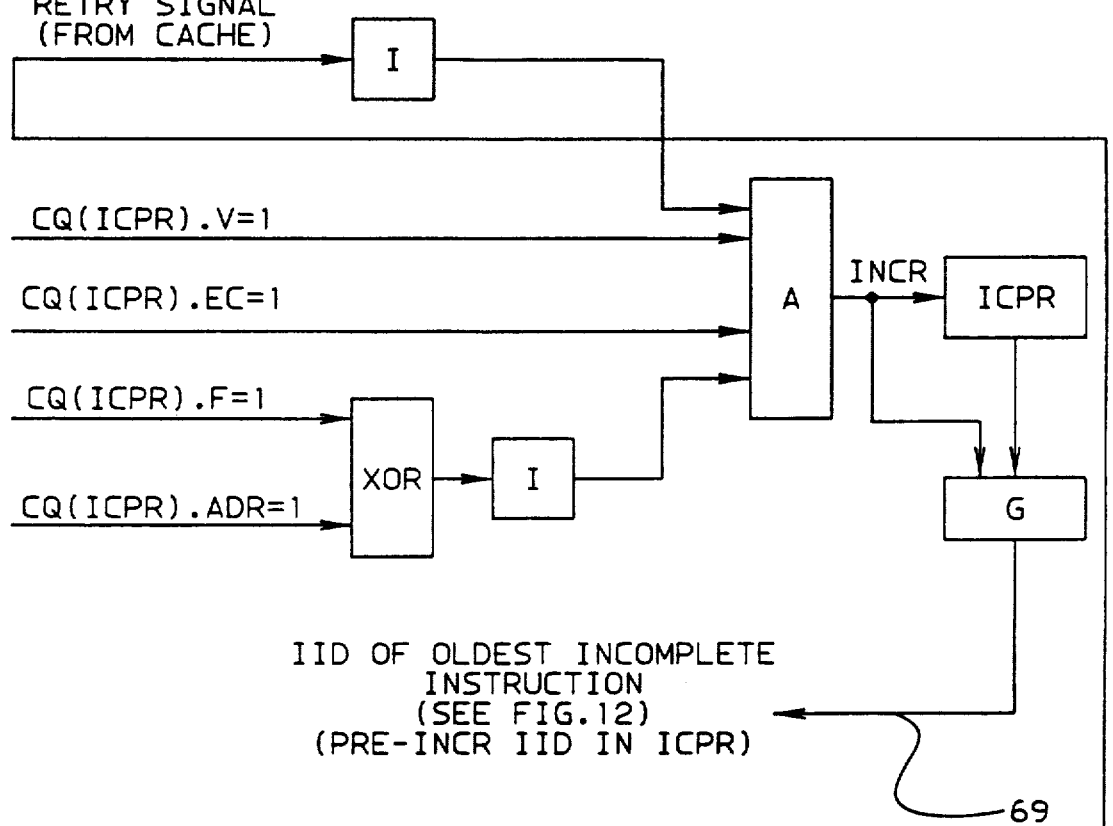
FIG. 22
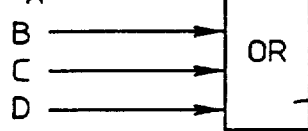

COORDINATION OF OUT-OF-SEQUENCE FETCHING BETWEEN MULTIPLE PROCESSORS USING RE-EXECUTION OF INSTRUCTIONS

INTRODUCTION

The subject invention relates to means for allowing deviations in the sequencing of operand fetches from their conceptual sequence specified by their program, while obtaining the same program execution results as the conceptual sequence in a multiprocessing (MP) environment. Out-of-sequence fetching may gain a significant improvement in system performance.

BACKGROUND

The particular function obtained by any computer program is dependent on the "conceptual sequence" of its instructions, i.e. the instruction sequence written into the program. The "conceptual sequence" of memory store and fetch operations is likewise determined by the written sequence of instructions. Thus, each program is expected to handle its instructions and their fetches and stores in their conceptual sequence. Thus, conventional CPUs maintain the conceptual sequence of fetches and stores during program execution to provide the program results in system storage which the program designer expects of the program.

In a multiprocessing (MP) system, erroneous data may be fetched by any processor in the MP system if operand fetches by a processor are allowed to have an order different from the operand order specified by the instruction sequence of the executing program.

The erroneous data problem is illustrated by the simple case shown in FIG. 1A, as follows:

1. Programs A and B are being executed on different processors a and b respectively in the MP. Each processor completes fetches and stores in the order specified by the program it is executing, i.e. each processor accesses its operands in the conceptual order of its respective program.

2. Program A has an instruction sequence that includes a store into a location x (i.e. STx) followed by a store into a location y (i.e. STy). The store order is STx ... STy.

3. Program B has a load instruction Ly that loads data Y from location y followed by a load instruction Lx that load data X from location x. The load instruction order is Ly ... Lx, which is the reverse of the store instruction order STx ... STy by the other program on the other processor.

4. Case 1 through case 6 shown in FIG. 1A represent all possible combinations (YX, YX' or Y'X') of the operand data values fetchable by program B from locations x and y.

5. Which combination YX, YX' or Y'X' happen to be fetched by program B from locations x and y is dependent on the time that program A does its stores, in relation to the fetching by program B. Any fetched combination is architecturally correct data if both programs A and B have accessed their operands in conceptual sequence.

6. But if any of the operands in program B is not accessed in its conceptual sequence (i.e. out-of-sequence, OOS), the OOS condition can cause erroneous data to be fetched, rather than the architecturally correct data required by the programs under the conceptual sequence architectural rules.

7. For example if the conceptual sequence of programs A and B would cause case 1 to happen, the required resultant data is YX. But if in case 1 the first operand fetch of data Y is delayed by a cache miss, and the second operand fetch of data X is accessed in the cache without delay, then operand Y is obtained after the store to location y changes data Y to Y'. Hence, the OOS condition causes the architecturally impossible combination Y'X to be fetched instead of the combination YX required by the conceptual sequence architectural rules.

To avoid violating the conceptual sequence architectural rules, prior computer systems maintained the conceptual sequence by not starting the execution of the next instruction in a program until the execution was complete for the adjacent prior instruction in the program sequence. Thus, a memory fetch or store for a next instruction in the program sequence was delayed until execution was completed for the prior instruction in the program sequence. All memory fetches and stores within any instruction were executed in the order specified by the architecture of the respective instruction.

However, the prior art discloses special cases where a CPU changed the actual sequence of fetching and storing operands from their conceptual sequence, and still got the correct program results. One prior technique was to detect any dependency on a prior store operand. This was done by comparing the address of each operand fetch request with the address of each prior uncompleted operand store request, and if none compared equal, no prior store dependency conflict existed.

Large CPUs have for many years used particular types of instruction overlap. Such overlapped execution required various techniques, which allowed some degree of out-of-sequence execution. The prior overlapping techniques took many different forms, and each technique had it own control problems. Some of these techniques were used in pipelined CPUs including CPUs having multiple execution units. They used various types of dependency detection techniques to allow multiple instructions in various states of execution to avoid certain types of problems that could be encountered in overlapping their execution. These techniques used control logic to detect dependencies between instructions to assure the same execution results as would be obtained if these instructions had executed in a non-overlapped manner, one at a time in their conceptual sequence.

The prior systems used instruction-completion controls for controlling instruction overlap, which recognized the end-of-execution for each instruction, to correlate the fetch and store operands of the respective instructions.

Interruptions to a program have been conventionally allowed on the completion of the execution of most instructions, and before starting the execution of the next instruction in the sequence. All outstanding fetch and store operands must be obtained before any instruction execution can be completed, and before an interruption can be started in relation to such instructions, e.g. the interruptions are serialized with the instruction stream. Serialization prevents program interruptions from interfering with the sequencing of operand fetches and stores. Only instructions requiring long execution times have been allowed to have interruptions before their completion, and only at the completion of the then outstanding fetches and stores, which defined temporary instruction stopping points at which interruptions could be allowed.

Also in the prior art, the tagging of a operand fetch request to memory was done to assure the proper receipt of fetched data by a subset of CPU registers reserved for receiving the fetched data required in the execution of an instruction. When the fetch data was obtained from memory, and put on a common data bus to all registers, each register had a compare means to compare tags transmitted with the fetched data on the bus with the tags stored at the reserved registers. Only on compare-equal conditions was fetched data allowed into the reserved subset of registers.

Also in prior systems, certain instructions were not allowed to use any overlap, such as the serializing instructions in the S/370 architecture that cannot start execution until all prior instructions have completed execution. A serialization operation includes completing all operand fetches and stores by prior instructions in the program sequence observed by other CPUs and by channel programs. Examples of such instructions are the S/370 compare and swap, test and set, etc. Many other serializing instructions are described in the IBM ESA/370 Principles of Operation (form number SA 22-7200-0) on pages 5-76 and 5-77.

A U.S. Pat. No. 4,991,090 (owned by the same assignee as the subject application) entitled "Posting Out-Of-Sequence Fetches" discloses a monitoring means for a CPU execution unit that detects when a fetch request may have its data returned out of the conceptual sequence of the instructions which issued the respective fetch requests. A table (or stack) has entries for memory fetch requests. Each table entry contains fields representing a fetch request, including the memory address, a tag identifying its instruction, a full/empty flag to indicate if the fields in the entry are full, and a valid flag bit to indicate if a full entry is valid. Each entry remains in the stack until it is invalidated. When made invalid, an entry may then be used for a new fetch request. Test addresses are provided by store addresses, and by cross-invalidate (XI) request addresses. An entry is marked invalid if its fetch address field compares equal with the test address, in the manner of an Operand Store Compare operation. But all entries in the stack are marked invalid upon the occurrence of a cache miss or a serializing event. The invalidation of an entry indicates it represents a fetch request that may be out-of-sequence.

A particular operand store compare problem is described in an article entitled "Handling of Fetches Subsequent to Unexpected Stores" published in the December 1985 issue of the IBM Technical Disclosure Bulletin on pages 3173 and 3174.

The von Neumann computer system basic architecture requires the instructions in a program to be in a "conceptual order" which is required to obtain an intended execution result for the program. This architecture provides operands which may be in the main storage of the system which requires that the operands be fetched from and stored in the main storage (also called system memory, or just memory). These same architectural requirements exist whether a program is executed in a uniprocessor system (UP) or in a multiprocessor system (MP).

As a consequence, the basic von Neumann computer system architecture places the "conceptual order" restriction on the program results, which are obtained by using its temporal relationship of fetching operand data (called "fetches"), with respect to other fetches and with respect to the storing of operand data (called "stores"). Since the result of program execution is affected by its conceptual order of instruction operand accesses, the program execution result must not be changed if any operand access in storage is not in the sequence required by the conceptual order of the instructions. In the past, later operand storage data in the conceptual order has been accessed later in the actual sequence of storage accesses.

SUMMARY OF THE INVENTION

The invention is concerned with maintaining a single image of storage to a plurality of processors accessing a common storage. The invention avoids a corruption in the single image concept which can inadvertently happen in some prior MP systems.

The subject invention provides means for allowing certain deviations in the sequencing of operand fetches from their conceptual sequence specified by their program. The allowed fetch sequencing deviations gain a significant improvement in system performance, while obtaining the same program execution results as the conceptual sequence in a multiprocessor (MP) environment.

The invention deals with various types of conditions that cause storage requests for fetch operand data to return the data in a different sequence than the requests were made, which is herein referred to as out-of-sequence (OOS) fetching. The OOS fetching of operand data is caused to go OOS by conditions which change the order of returned data relative to the decoded order of the fetch operand sequence called the conceptual sequence. A number of conditions can cause fetch requests to go out of their conceptual sequence, such as when each fetch request is issued to storage as soon as the fetch request is in a form which can be issued to storage.

Conditions which can cause operand fetching to go OOS include: 1. delaying the issuance of a fetch request to storage (such as delays in generating the address for a request); 2. speeding up an operand data return (such as fetching the operand data from a store buffer (SB) in the execution unit without going to storage for the data); 3. delaying the return of operand data (such as when a fetch request has a cache miss and its data must be obtained from the storage hierarchy); or 4. overlapping the fetching of an operand of a serializing instruction with the accessing of operands of instructions preceding the serializer or of instructions following the serializer before its completion. A serializer operand is also allowed to be OOS as well as overlapped with operands of other instructions.

Furthermore, this invention can handle multiple OOS conditions for a fetch operand, which occurs when more than one of the conditions listed in the preceding paragraph simultaneously exists for any one fetch operand. The allowable combinations of simultaneous OOS conditions that can exist for a fetch operand includes various combinations of the conditions listed in the preceding paragraph, except a cache miss and a fetch from a SB cannot simultaneously exist, but any other combination can exist in doubles, triples, etc.

This invention enables a controlled reordering in the program specified sequence of fetches with respect to other fetches, and with respect to stores. The invention does not require any execution reordering in the program specified sequence of operand stores or instruction completions. Both fetches and stores retain their conceptual sequence at instruction completion time, thereby maintaining the same program results.

Implicitly or explicitly, the invention assumes the following requirements in the use of the storage hierarchy of the system: (1) fetches must appear to occur in program specified order, (2) stores must appear to occur in program specified order, (3) a store for a given instruction must appear to its CPU to precede any operand fetch for each subsequent instruction, (4) a fetch to a given storage address must return data from the most recent store to that address, and (5) a single image of storage appears to all processors in a multiprocessor, which all see the same changes to storage locations, and in the same relative order.

The invention provides special controls which prevent an exposure to a wrong program result in doing a fetch out-of-order when the fetched data may be different from the data obtained by the same fetch if done in its conceptual order.

Consider a fetch which is returned earlier than its conceptual order (an early fetch). The fetch may obtain wrong data if it is required to fetch data changed by a prior store but the store has not yet occurred due to the fetch being out of sequence. Then, the early fetch returns unchanged data when it should return changed data. This problem exists whether the data is changed by the same CPU or by a different CPU.

But suppose no store occurs between an early fetch and its conceptual order. Then the fetch would access the same data by either an early fetch or a conceptual fetch. No harm is done by using the early fetch when its instruction is completed in the instruction's conceptual sequence.

Next consider a fetch which is performed later than its conceptual order (a late fetch). A wrong program result is obtained for a late fetch only if a conceptually later store occurs that changes the data at the same address before the late fetch accesses the data. Then, the late fetch returns different data than it should have returned if done in its conceptual sequence.

Now suppose no store occurs between an late fetch and its prior conceptual order. Then the same data may be accessed by either a late fetch or a conceptually-sequenced fetch. No harm is done by using the late fetch when its instruction is completed in the instruction's conceptual sequence.

The invention detects exposure to wrong program results by detecting reordered fetches (out of conceptual sequence) to determine if any fetch may have obtained the wrong data.

This invention assures adherence to the rule that all processors tightly coupled to a common storage must each see the same data in storage that would be seen if the processors were executing instructions in conceptual order.

Whenever any exposure is detected for an OOS fetch, the exposure is cured by refetching the data in a manner that avoids the exposure, such as by reexecuting the part of a program having an exposed fetch so that the exposure can not exist during the reexecution.

Many different implementations for curing detected exposures will become apparent. Some implementations may also require that unexposed fetches before and/or after an exposed fetch also be redone. Such less precise implementation may be found to have simplicities in their implementation.

The order of the fetches and stores may be determined by assigning an identifier to each operand to designate its location in the conceptual sequence. This is conveniently done by assigning IIDs (instruction identifiers) to the operands to represent their conceptual sequence, e.g. by incrementing by 1 each next IID assigned to the next instruction in the conceptual execution sequence. The same IID for plural operands in an instruction may present no problem since they are collected as a group for executing their instruction. Most computer architectures provide no more than one store operand for any instruction, which also is given its instruction's IID. Separate operand identifiers may be assigned to the operands internal to an instruction to distinguish them.

In such case, the conceptual sequence of operands is indicated by their assigned IID sequence. Each operand in the conceptual sequence has an IID greater than, or equal to, the IIDs of its prior operands; and each operand in the conceptual sequence has an IID less than, or equal to, the IIDs of its following operands. These inequalities are used by the invention for the detection of out-of-sequence (OOS) operands. Accordingly, an out-of-sequence (OOS) operand may be detected whenever the IID of the operand is greater than the IID of a following operand, or is less than the IID of a preceding operand, in the temporal sequence of the operands.

Any fetch or store operation involves many suboperations: such as the instruction unit generating the operand's effective address, requesting cache storage for the operand data, waiting for the data to be accessed in storage, and the return of fetch requested data, or the return of a store acknowledge signal that store requested data has been stored. The wait for the completion of a data access is variable, from a one cycle wait if an L1 cache hit occurs, to dozens of cycles of wait if an L1 cache miss occurs requiring the data to be accessed in a storage hierarchy which may include an L2 cache, an L3 main storage, and DASD backing storage.

A store occurs at the time a store acknowledge signal is received in the execution unit. And a fetch occurs when its data is returned from storage. The normal time when a store's data becomes available for fetching is after the store acknowledge signal is received. The invention also allows fetching from store buffers (SBs) in the execution unit, which is early in relation to the store acknowledge signal, confirming that stored data is available in the SB for fetching.

Stores in a multiprocessor complex (MP) can be divided into local and remote stores. A local store is done by the same processor that is fetching the stored data. A remote store is done by a different processor than the processor fetching the stored data. Remote stores are made known to the local processor by means of a cross invalidate (XI) request.

A fetch occurs at the time its data is returned to the execution unit in the CPU from the storage hierarchy. Returned data is no longer affected by events in the storage hierarchy, such as by a cross-invalidate (XI) signal to remove a local copy of the data unit from a processor's L1 cache when another processor wants to store into that data unit. The return time of fetched operand data determines whether the fetch is considered early or late.

Fetches in a multiprocessor complex (MP) can be divided into local and remote fetches. A local fetch is requested by the same processor that has the fetch data in its L1 cache. A remote fetch is requested to a different processor. Remote fetches are made if the remote processor wants exclusive control over the data unit, such as for writing into it, and then a cross-invalidate (XI) request is sent to the local CPU to invalidate its corresponding data unit.

A fetch may be requested out-of-sequence (OOS), or it may go out-of-sequence (OOS) even when it is requested in sequence, such as when its returned data unit is delayed, e.g. by a cache miss or by interlocks on prior fetch operations. Or a fetch may be made OOS by being speeded up such as by being accessed in a local store buffer instead of from the cache. Or a fetch may be architecturally considered OOS (herein called quasi-OOS) such as fetches adjacent to a serialization instruction.

A fetch request may be to the same address (i.e. to the same data unit) as a following store request, when the store is prior to the fetch in their conceptual sequence. Then an "operand store compare (OSC)" condition exists. Prior art processors, that are pipelined and overlapped, have used OSC detection and control means with conceptually-sequenced operands for maintaining the conceptual sequence by forcing a wait by a later instruction until data is store into by a prior instruction at the fetch-requested address. But prior OSC controls will not detect OSC conditions caused by allowing OOS fetches, such as with this invention.

If the OSC is detected before the store is made, the affected fetch may be held up until the store has completed (by the storage means reporting the store completion back to the OSC controls). But if an OSC condition is detected for an OOS fetch that possibly obtained the wrong data, this invention forces a retry for refetching the data from the requested address to get the correct data after the store is complete, and the retry may include OOS fetching or conceptual sequence fetching. This OSC for OOS fetching is solved by this invention for XI hit data in an MP, while standard techniques are used for other OOS fetches in a UP.

This described embodiments are concerned with detection of fetch operations that are OOS and provides mechanisms for maintaining storage integrity under an OOS fetch condition in an MP environment.

The means for detecting OOS fetches include:

(1) Special controls for handling OOS fetch requests in a cache while a cache miss is being serviced by the storage hierarchy. When these cache controls are invoked, they may indicate that an OOS fetch is late because it missed in the cache, or that it is early because it hit in the cache while a prior request missed in the cache and has not yet returned. Any OOS fetch having an OSC with an XI hit is handled by these special controls.

(2) These special controls operate with decoded fetch operand specifications of instructions while their effective addresses (EAs) are being generated and issued to the cache to detect when they are OOS fetches. These special controls signal an OOS fetch for an EA generated request to the L1 cache when it has an IID greater than the IID of an EA being generated and not yet requested.

(3) Special controls for handling quasi-OOS fetches that deviate from architectural rules which specify special timing relationships between fetches, stores, and other events, such as for serialization instructions.

The invention includes the following means for maintaining data integrity in an OOS fetching situation:

(1) means for determining which fetches are OOS or quasi-OOS, (2) means g when an XI request of another CPU is occurring in a window of OOS fetch exposure, and (3) means for repeating the execution of the instructions of a program that have an XI occurring during a window of OOS fetch exposure by refetching that data under non-OOS conditions to assure the correct program results.

The XI detecting means may include a directory array means accessed with a cache directory entry for locating a cache data unit in the processor required by an outstanding OOS fetch request. If the XI detecting means finds an XI request is to a cache data unit receiving an OOS fetch request, the cache. directory means sends information to the fetch request providing means of a possible conflict of the XI request with an OOS fetch window of exposure, and that reexecution is to be done for that part of the program to assure correct program results. The OOS indication for the fetch request is removed when that part of the program is retried. The retry means continues to be subject to OOS fetching conditions and causes retries whenever required by the detection of an OOS exposure.

It should be recognized that a broad range of structures are disclosed and claimed for this invention, and that an over-indication of an OOS fetch window of exposure using the retry solution will provide correct program system operation with some loss in performance in exchange for economy of implementation.

It is therefore an object of the subject invention to allow a processor to fetch operand data from memory that is out-of-sequence in relation to fetch operands of other instructions, while obtaining execution results determined by the conceptual sequence of instructions in any program being executed.

It is another object of the subject invention to allow fetch operands to be fetched while one or more prior fetch operands are made to go out-of-sequence due to delays in its address generation.

It is a further object of the subject invention to allow a fetch operand to be accessed while a prior fetch operand has to a cache miss.

It is still another object of the subject invention to allow the fetching of data from store buffers in a CPU execution unit before the store buffer data has been stored in a CPU cache.

It is a another object of the invention to allow out-of-sequence (OOS) fetching for a fetch operand that has more than one OOS condition simultaneously existing.

It is a further object of the subject invention to enable the re-execution (retry) of fetches for incomplete instructions having out-of-sequence fetch operand data that cannot be otherwise put in its correct sequence.

It is another object of the invention to handle OSC (operand store compare) conflicts with other processors in a multiprocessor (MP).

It is a further object of the invention to allow out-of-sequence (OOS) fetching of an operand that is exposed to a cross-invalidate (XI) hit by another CPU in a multiprocessor (MP).

It is a still further object of the subject invention to allow the use of an OOS flag field with each cache directory entry to enable the detection of OSC conflicts between CPUs in an MP.

It is another object of the invention to allow an operand fetch for a serialization instruction to be made prior to an operand fetch for an instruction prior to the serialization instruction in the conceptual sequence of instructions in a program.

It is also an object of this invention to allow the use of an associative OOS flag field table to improve the system performance for XI handling under OOS fetch conditions.

BRIEF DESCRIPTION OF THE DRAWINGS

FIG. 2 illustrates sequences of fetch operands that contain operands which are out-of-sequence (OOS) by being early or late in relation to other operands in the sequence.

FIG. 21 is a logic diagram illustrating controls for an IDPR (instruction decode pointer register) used with the CQ.

FIG. 22 is a logic diagram illustrating controls used in initiating an instruction retry operation.

DETAILED DESCRIPTION OF THE INVENTION

Figure 1A:
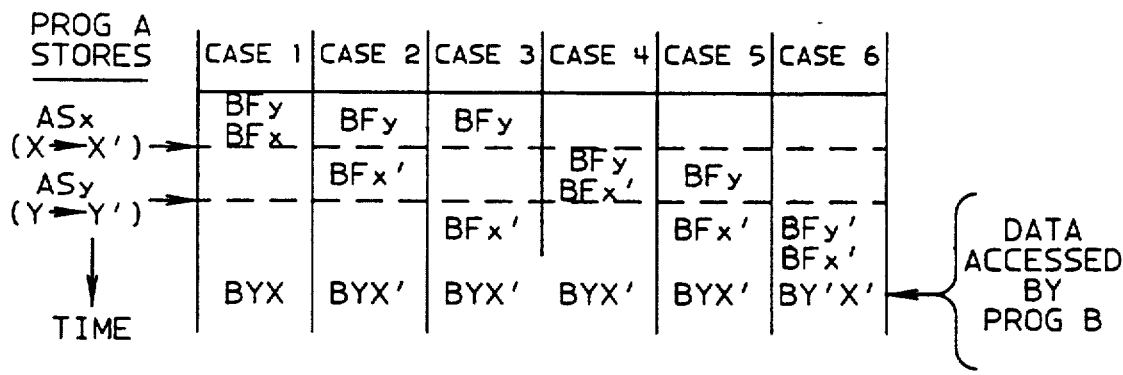
FIG. 1A shows store and fetch diagrams used to illustrate the conceptual sequence architectural rules, and how they can be violated by fetching operands out of conceptual sequence.
Figure 1B:
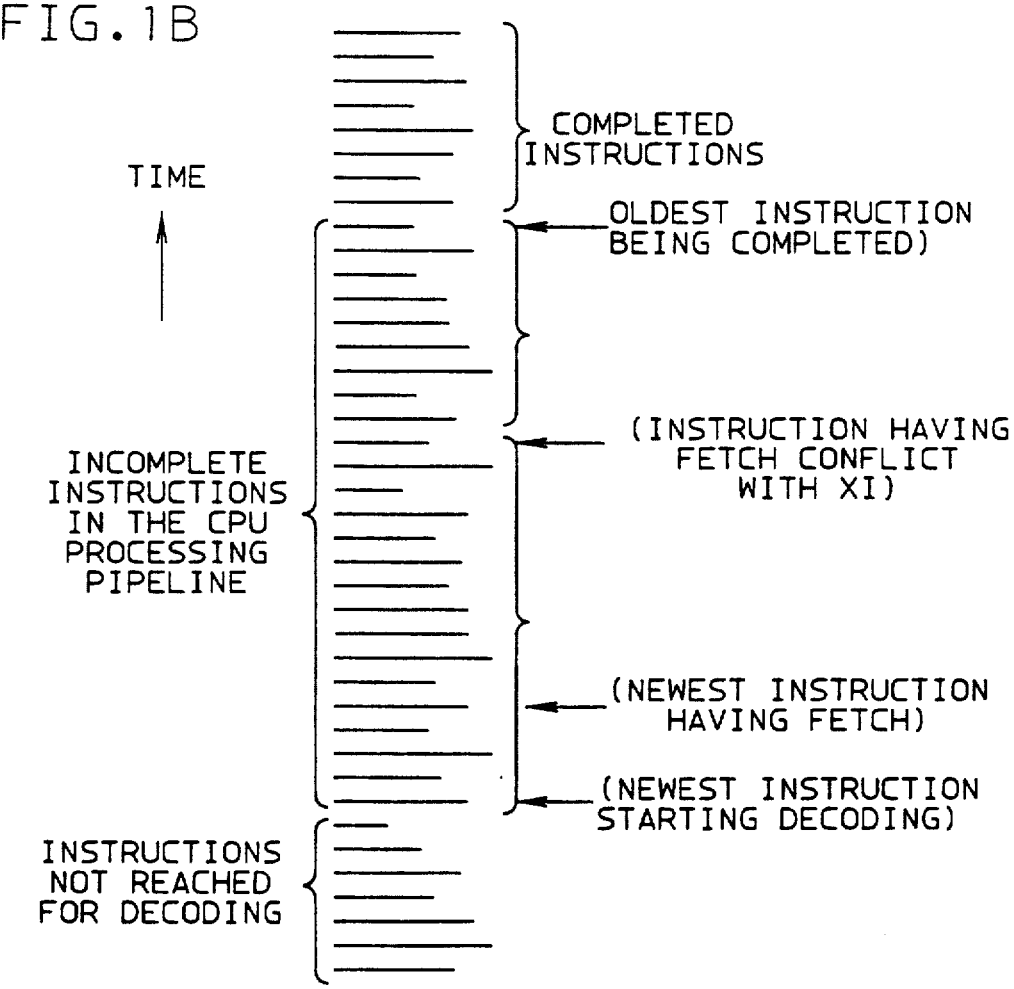
FIG. 1B illustrates a pipelined instruction sequence in a processor that includes instructions before and after being executed, as well as instructions not having their execution completed.

FIG. 1 illustrates various phases in the execution processing of an instruction stream in a CPU's conceptual instruction execution pipeline. The instruction sequence in the stream is determined by the start of instruction execution in the hardware in a CPU, which may overlap the execution of its instruction. At one end of this pipeline are instructions which have not yet begun executing. At the other end are instructions which have completed execution.

In between are instructions which are being executed that have their instruction processing incomplete. The incomplete sequence of instructions is bounded at one end by the current instruction beginning its decoding. At the other boundary of the incomplete stream is an instruction which is closest to being completed.

Some of the instructions have register operands, and other instructions have storage operands. Still other instructions have a storage operand and another type of operand. Any instruction having at least one storage operand, is considered a storage type of instruction for the purposes of this invention. Storage instructions may have only one or more fetch operands, or they may have one or more fetch operands and one or more storage operands. It is the purpose of this invention to permit the fetch operands to execute out of the conceptual instruction sequence, either early or late.

FIG. 2A provides an example of a conceptual sequence of operands, in which the instruction IID of each operand in the sequence is always increasing. Thus, in FIG. 2, the time sequence of the operands is 1,2,3,4,5 regarding when the operands perform a fetch (F) or store (S) in main storage.

FIG. 2B provides an example having out-of-sequence (OOS) operands with IID's of 4, 3, 2, any of which may be an early and/or late operand, depending on its time occurrence relative to another operand in the time sequence of operands.

FIG. 2C illustrates relative tests for determining whether an operand is early or late. The test is done relative to a preceding or following operand. The operands are in their conceptual sequence as long as each next operand in time sequence has an IID that is greater than or equal to the IID of its preceding operand and is equal to or less than the IID of its following operand.

The early fetch operand test is a relative comparison between the operand's IID and its following operand's IID. An early fetch operand is indicated if the operand's IID is greater than its following operand's IID. In the example shown, F4 is an early fetch operand, because its IID of 4 is greater than the IID of 3 for the following operand F3.

Also in FIG. 2C, the late operand test is a relative comparison between the operand's IID and the following operand's IID. A late operand is indicated if the operand's IID is less than its prior operand's IID. In the example shown, F2 is a late fetch operand, because its next prior operand's IID of 3 is greater than the late fetch operand's IID of 2. Fetch operand F5 gets back to the conceptual sequence, because its IID of 5 is greater than the IID's of its prior operands and is less than the following operand's IID of 6 in the time sequence of operands.

When OOS fetching of instruction operands is allowed, there will be times in the instruction execution operations when it will be necessary to reexecute (retry)

some or all of the instructions in the incomplete instruction stream.

Any such retry process can start at any instruction in the incomplete sequence between the current instruction being completed and a "theoretical start retry instruction". The theoretical start retry instruction is the oldest instruction for which a retry is essential, the retry being unessential for the other instructions between it and the oldest incomplete instruction. The theoretical start retry instruction is the oldest instruction having a fetch that missed on an operand store compare (OSC) operation with a store operand in a prior instruction on a different CPU.

The theoretically most efficient place to restart is at the theoretical start retry instruction. However, complex and expensive additional hardware may be needed to precisely detect the theoretical start retry instruction. Preexisting hardware detects the oldest instruction being completed, which is the simplest place to start a retry of instructions.

Figure 3:
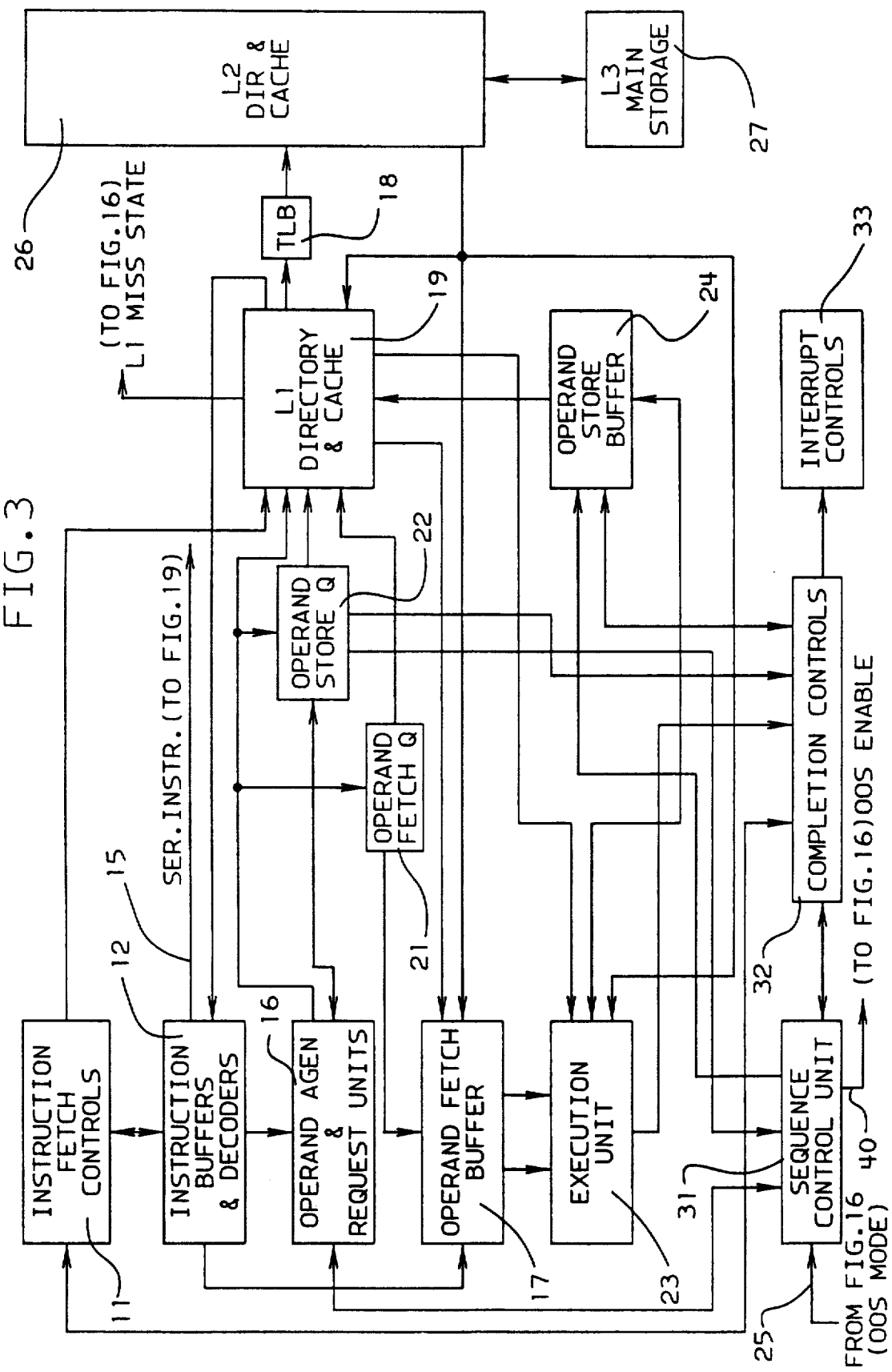
FIG. 3 is a block diagram of a processor in a MP and how it interfaces a storage hierarchy.

FIG. 3 illustrates an example of a CPU that may provide the environment for using the subject invention. It includes instruction fetch controls 11 that control the fetching of instructions from memory. Controls 11 communicate with an L1 cache directory 19 to request cache lines containing instructions. The L1 cache arrangement 19 includes a L1 cache and is connected to an L2 cache directory and cache 26, which in turn is connected to an L3 main storage (i.e. main memory) 27.

The lines of instructions fetched by controls 11 are stored in instruction buffers and are decoded by associated decoders represented by box 12. The decoders 12 provide operand address component values (B, X, D) to operand address generation (AGEN) and request units 16 that generate the operand logical addresses using the formula (B)+(X)+D, which is well known in the IBM S/370 architecture, which is the computer architecture used throughout this specification. A plurality of AGEN elements are provided in unit 16 in order to allow a plurality of AGEN operations to be generated in parallel. Any AGEN element is made busy when it receives an AGEN request from decoder 16 with all required address components for generating an operand address. Each next operand AGEN request selects a non-busy AGEN element in unit 16. An AGEN element generates an effective address of an operand from the received address components. The addresses are generated in the sequence that they are requested by decoders 12. An effective address is a logical address that may be virtual or real, depending on the state of the program status word (PSW) in the CPU.

Each generated operand effective address (which is virtual) is address translated by well-known means that includes a Translation Lookaside Table (TLB) 18 that provides a translated address (an absolute address) to a L1 data directory and cache 19, and also to the L2 directory and cache 26.

The L1 cache 19 is assumed to be a store-through type of cache, and the L2 directory and cache 26 is assumed to be a store-in type of cache in the preferred embodiments. However, this invention may be used with all types of cache arrangements.

The L1 directory provides an L1 miss signal output 28 to signal when a fetch operand is being delayed in the storage hierarchy of L1, L2, L3, etc. storages.

TLB 18 also provides its translated address to an operand fetch queue 21 for an operand fetch request to storage, and to an operand store queue 22 for an operand store request to storage.

When fetched, each fetch operand is received in an operand fetch buffer 17. An execution unit 23 receives the fetch operands and generates store operands which are put temporarily into an operand store buffer 24. The store operands are transferred to the L1 cache 19 for writing into the L2 cache 26 and the L3 main storage 27.

The instruction sequence accessed by instruction fetch controls 11 is controlled by a sequence control unit 31 driven by instruction completion controls 32. Unit 31 provides an OOS override signal 40, when it is instructed to execute all instructions in their conceptual sequence by an OOS mode signal 25 being received in an on state. Signal 40 must be off for the OOS operations of this invention to occur.

Program interruption controls 33 are connected to the completion controls 32 which determine when program interruptions can be allowed in relation to the instruction stream being executed, e.g. without damaging the result of any instruction being executed.

The instruction decoders in unit 12 decode each instruction in the stream and assign it an instruction identifier (IID). The IID numbers are unique to the instructions currently being handled by the CPU at any time. The IID numbers are generated by a conventional counter (not shown) in a round-robin manner that repeats on a modulo value that is large enough to obtain the required IID uniqueness at any given time. An increasing number sequence is obtained for all currently active IIDs as they are assigned to the instructions, which are handled in their conceptual sequence by decoder 16.

The decoders 12 provide a serializer signal to sequence control unit 31 when a serialization instruction is detected. Then, unit 31 provides a serializer state signal 29.

Each operand is initially determined by an operand request unit 16 to be either a fetch operand or a store operand. Then, a fetch or store request signal is sent by unit 16 to the appropriate queue 21 or 22 in which an entry is allocated for the respective request. Further, the generated effective address (EA) and the corresponding IID are written into the newly allocated entry in unit 21 or 22.

A store request requires one of a plurality of store buffers in unit 24 to be assigned to each store request, even it the store request will generate an entire cache data unit. For this reason, each store request also is provided by the execution unit 23 to the fetch queue 21 as well as the store queue 22. Accordingly, a store request usually causes an initial fetch request to the cache (called store interrogate) to copy the required data unit into the assigned store buffer 24. This causes entries to be allocated in the both the fetch queue and the store queue for the store request. A special flag bit is set on in the fetch queue entry to indicate the entry represents a store request. A store (having a size less than a cache store unit) is merged into the fetched data in the store buffer to change the data unit. The data unit is then sent to the L1 and L2 data caches.

FETCH QUEUE STRUCTURE

Figure 4:
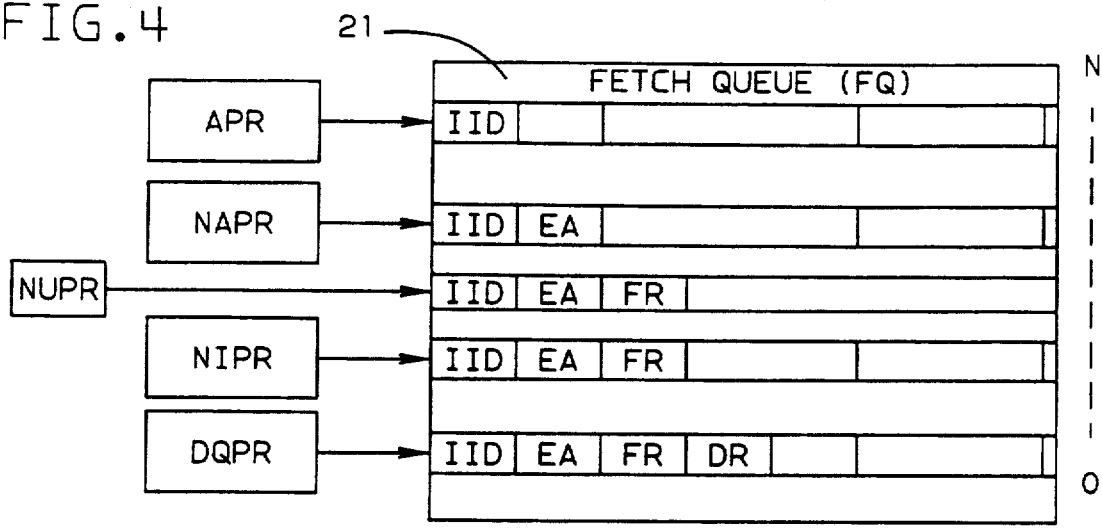
FIG. 4 illustrates a fetch queue (FQ) having a plurality of pointer registers designated APR, NAPR, NUPR, NIPR AND DQPR.
Figure 5:
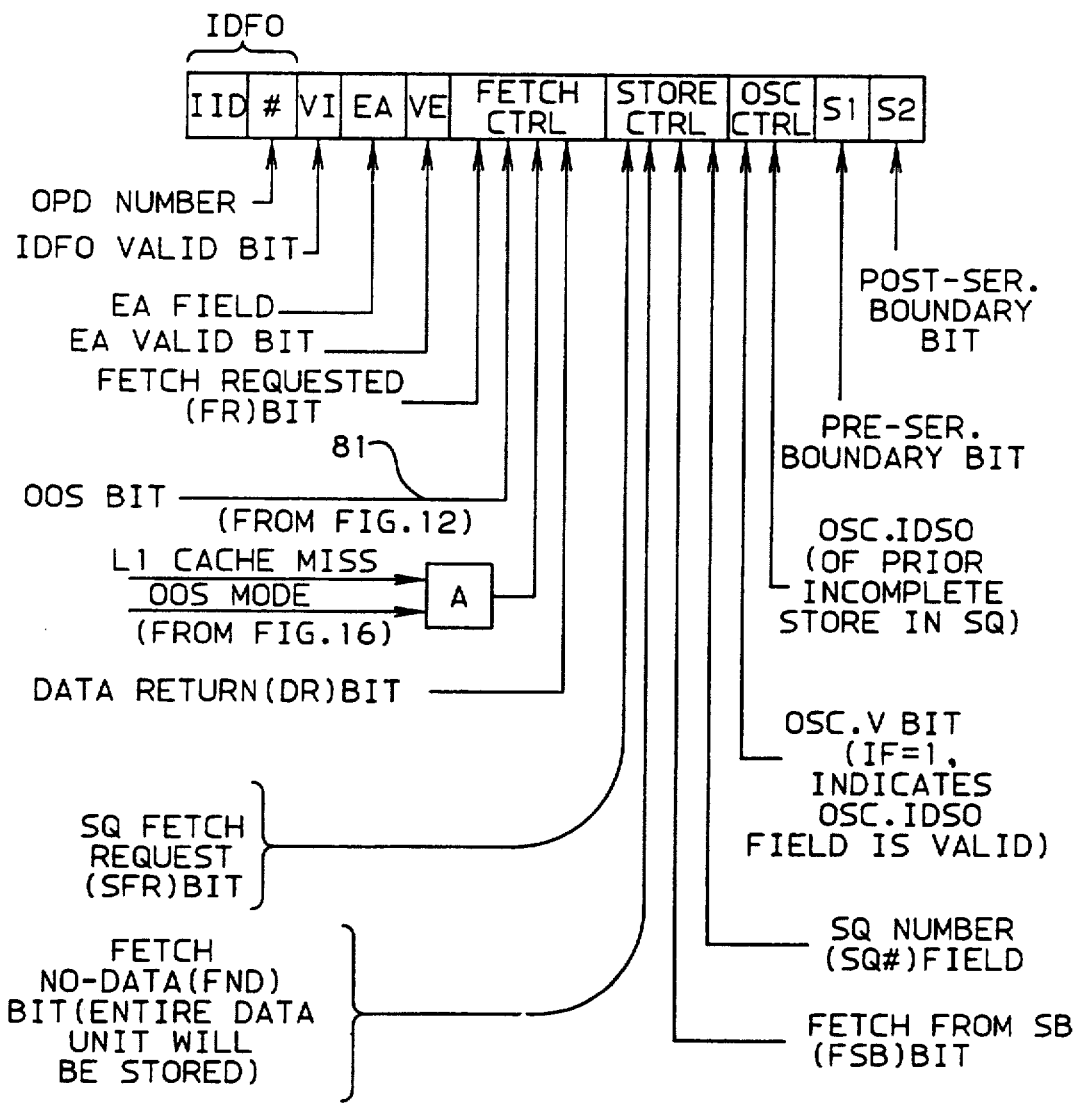
FIG. 5 represents the fields in each FQ entry.

FIG. 4 represents the fetch queue (FQ) 21 having respective entries 0 through N. FIG. 5 shows the form of each FQ entry. Each FQ entry has: an IID field, an IID valid bit VI, an EA field, an EA valid bit VE, a fetch-control section, a store-control section, an operand-store-compare (OSC) control section, and a serializer control section. The fetch-control section contains: a fetch requested bit, an OOS bit, a cache miss bit, and a data return bit. The store-control control section includes a store queue fetch request bit, a fetch no-data bit, a store buffer (SB) available bit, and a data in SB field. The OSC control section includes: an OSC indicator bit, and a prior-store IID field. The serializer control section supports serialization instruction out-of-sequence fetch operations in the OOSDT embodiment later described herein.

The FQ entry shown in FIG. 5 has the following fields:

IID field: receives the IID of the instruction having the fetch operand field that is generating this fetch queue entry. The IID and operand # together are an IDFO (identifier of a fetch operand.)

Operand number (#): a two bit indicator distinguishing this operand from any other operand in the same instruction. The IID and # fields together provide an IDFO (identifier of fetch operand).

VI field: indicates the associated IID field and operand number are valid if 1, or invalid if 0.

EA field: receives the effective address for the fetch operand generating this fetch queue entry. The EA is generated by (B)+(X)+D in which (B) and (X) are the respective contents of the base and index general purpose registers.

VE field: indicates the associated EA field is valid if 1, or invalid if 0.

The fetch-control section fields are defined as follows:

Fetch requested (FR) bit: set to 1 when data is requested from the L1 data cache by this entry. It is set to zero to indicate that no data has yet been requested from storage for this FQ entry.

OOS bit: set to 1 to indicate this request is being fetched before at least one later issued fetch request and therefore is out-of-sequence. If set to zero, indicates this FQ entry is in its proper instruction sequence.

L1 Cache miss bit: set to 1 when the FQ entry receives a L1 cache miss signal and OOS mode signal. If set to zero, indicates no cache miss occurred.

Data return (DR) bit: set to 1 when data is received by the processor from the L1 data cache for the request represented by this entry. It is set to zero to indicate that no data has yet been received from storage for this FQ entry.

The store-control section fields are defined as follows:

SQ fetch request (SFR): if set to 1, indicates the fetch request represented by this FQ entry is being done for a store request in the store queue 22 issued by the instruction defined by the IID in this FQ entry. If set to zero, indicates this entry represents a pure fetch request (without any store request).

Fetch no-data (FND) bit: set to 1 to indicate that this fetch request for a store instruction does not require any data to be fetched at the EA, because the instruction will be storing the entire data unit. If set to zero, indicates the data unit at EA may be fetched.

Fetch from SB (FSB) bit: if set to 1, indicates the SB contains the entire data unit requested by this FQ entry, and then the SB# field locates the data unit in the SB. If set to 0, indicates the SB does not contain the entire data unit requested by this FQ entry, so that the data unit must be accessed in the L1 cache.

SB number (SB#) field: locates a store buffer (SB) from which the entire data unit requested by this FQ entry may be more quickly fetched than from L1 cache.

The OSC-control section fields are defined as follows:

OSC.IDSO: contains the IID and operand number identifying a store operand in a prior instruction which has an OSC conflict at the same storage address as this fetch request, but the store has not yet occurred.

OSC.V bit: if set to 1, indicates the OSC.IDSO field in this FQE validly contains the IID and operand number of a conflicting store operand of a prior instruction which is currently incomplete. If set to 0, indicates the content of the OSC.IDSO field is not valid.

The serializer-control section fields (used by the OOSDT embodiment) are defined as follows:

S1: if set to 1 indicates its FQE represents a fetch operand in a serializer instruction. If set to 0 indicates its FQE does not represent a fetch operand in a serializer instruction. S1 is used for enabling overlapped OOS fetching for a serializer instruction.

S2: if set to 1 indicates its FQE represents a fetch operand in an instruction following an incomplete serializer instruction. If set to 0 indicates its FQE does not represent a fetch operand following an incomplete serializer instruction. S2 is used for enabling overlapped OOS fetching of a serializer instruction with following operands.

STORE QUEUE STRUCTURE AND OPERATION

Figure 6:
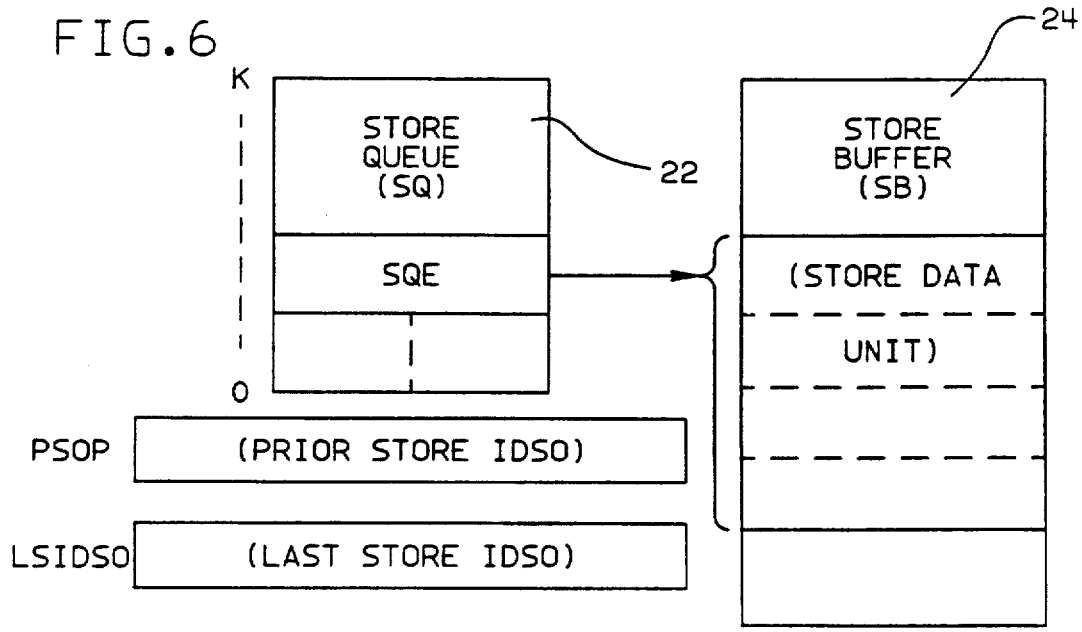
FIG. 6 illustrates a store queue (SQ) and its associated buffer (SB), prior store operand pointer register, and a last serializer IDSO (identified store operand).

FIG. 6 represents the structure of the store queue (SQ) 22 and of the store buffer (SB) 24. The SQ has respective entries 0 through K. Each SQ entry represents one variable-length data unit in the SB 24. A data unit in the SB may be variable length of from 1 to 4 words. The store entries are made in the store queue in the IID sequence of executing store instructions, and they are handled in IID sequence. That is, store requests are not handled out-of-sequence in this embodiment like the fetch-request entries in the FQ.

Figure 7:
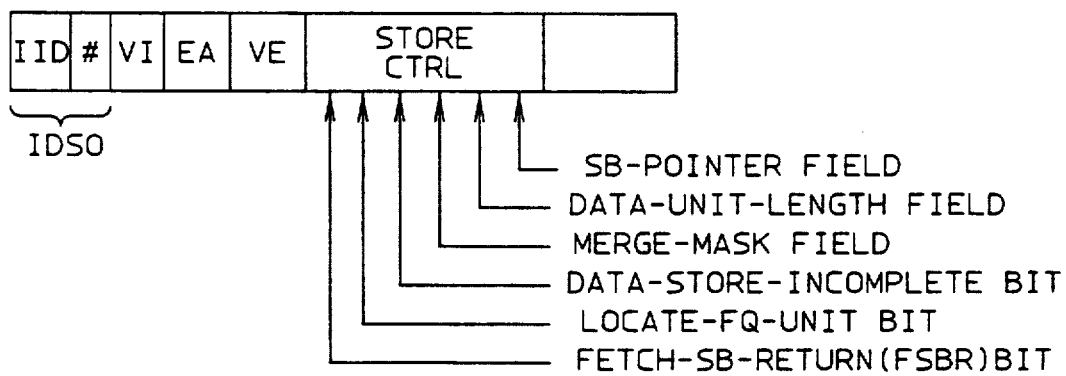
FIG. 7 represents the fields in each SQ entry.

FIG. 7 shows the form of each store-queue entry, which has an IID, EA, control fields VI and VE, and a store control section.

Each SQ entry has the following fields:

IID field: receives the IID of the instruction having the store operand field that is generating this SQ entry. The IID and operand # together are an IDSO (identifier of a store operand.)

Operand number (#): a two bit indicator distinguishing this operand from any other operand in the same instruction.

VI field: indicates the associated IID field and operand number are valid if 1, or invalid if 0.

EA field: receives the effective address for the store operand generating this store queue entry. The EA is generated by (B)+(X)+D in which (B) and (X) are the respective contents of the base and index general purpose registers.

VE field: indicates the associated EA field is valid if 1, or invalid if 0.

The store control section includes the following fields:

SB-pointer field: contains the location in the SB of the data unit(s) represented by this SB entry.

Data-unit-length field: contains the length in data words for the corresponding data unit in the SB represented by this entry.

Merge mask field: a byte field in which the respective bits represent corresponding bytes in the data unit represented by this entry in the store buffer. When any bit in the mask is set to 1, it indicates its respective byte location in the data unit is to have a merged word stored there. When all bits in the mask field are set to 1 values, the entire data unit will be stored by the execution unit, so that no store merge operation is to be done.

Data-store-incomplete bit: When set to 1, indicates the store operation represented by this SB entry has not yet been completed, and the data unit cannot be accessed. It is set to 0 when the store operation represented by this SB entry has been completed.

Locate-FQ-unit bit: If set to 1, a data unit being requested by a FQ entry will be entirely found in this SB data unit when its execution is completed.

Fetch-SB-return (FSBR) bit: When FSBR is set to 1, all or part of this SB data unit has been fetched in response to a fetch request by a FQ entry.

An SQ entry is deallocated in the store queue when a store completion acknowledge signal is received from the L1 and L2 caches indicating the store operation has been successfully completed in the store buffer and copied into both the L1 and L2 caches.

OOS FETCH HANDLING WITHIN A CPU

Operand fetch requests are made only by instructions that require at least one data fetch from system main storage (memory). Each operand fetch request causes an entry to be made in the fetch queue (FQ). Thus, instructions (such as register-to-register instructions) which do not have any operand to be fetched from memory will not have any entry represented in the FQ.

Instructions with store operands usually require a fetch operation to obtain the data unit to be stored into, and therefore use the fetch queue. The FQ has N+1 entries at respective locations 0 to N. Thus, the allocation sequence of locations in FQ goes from 0 to N, and then repetitively wraps back to 0, as the entries are reused.

While an instruction is being decoded, an entry is put in the FQ for each operand fetch request (including each fetch request for a store operand). The decoding process pipelines to the address generating means, which determines the effective address (EA) of each operand request to be accessed in memory. The generated EA for each memory fetch is written into an entry allocated for the operand in the FQ.

This invention involves searching the FQ and SQ in the process of determining which entry is to be processed next. Although theoretically the searching can be done serially through the entries in the queue, it preferably is done in parallel to all queue entries at the same time, because a parallel search of all entries in a queue can be done much faster than a serial search through a queue and the speed of searching may be critical to system performance. Accordingly, the preferred embodiments of this invention use parallel logic hardware, commonly known as combinatorial logic circuits, to obtain parallel operations for what may be more clearly described in terms of serial operations. FIGS. 12 through 16 include combinatorial logic circuits for obtaining such parallel operations.

FETCH QUEUE OPERATION

FIG. 4 shows the FQ as a hardware array controlled by four pointers contained in different registers. They are: an Allocation Pointer Register (APR), a Next In-Sequence Fetch Pointer Register (NIPR), a Next Actual Fetch Pointer Register (NAPR), and a Dequeuing Pointer Register (DQPR).

This invention controls the execution of memory-referencing instructions using pointer values in APR, NIPR, NAPR and DQPR. Initially, the APR, NIPR, NAPR and DQPR content are each set to point to the first entry at location 0 in the FQ.

A NUPR (next unfetched pointer register) shown in FIG. 4 is used with the OOSDT embodiment, later described herein.

APR (ALLOCATION POINTER REGISTER) OPERATION

The APR pointer selects the FQ entry which is next to be allocated. The CPU decoder assigns the next IID value to the next instruction as it begins being decoded in the CPU. The decoder writes the assigned IID and its valid signal, VI=1, into the IID and VI fields of the currently selected APR entry, which is the next allocated APR entry. The VI=1 signal increments the APR to its next pointer value, and the decoder writes an entry for any next fetch request for that instruction, until an FQ entry is allocated for each fetch request required by the instruction. The IID sequence provided to the APR need not be for sequentially-adjacent IIDs, since the sequence of IIDs entering the FQ will skip the IIDs of non-memory accessing instructions. After being incremented once for each fetch request of the currently decoded instruction, the APR pointer points to an un-allocated entry in the FQ next to be used for an APR operation.

The last entry allocated by the APR always has a newer IID than the entries pointed to by the other FQ registers: NAPR, NIPR and DQPR.

Figure 14:
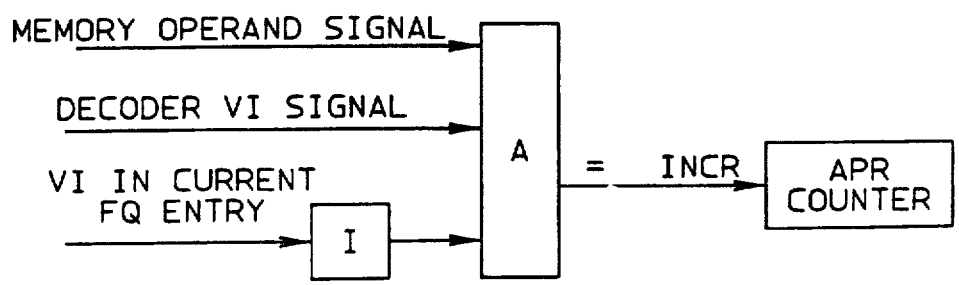
FIG. 14 is a logic diagram illustrating the APR control means.
Figure 15:
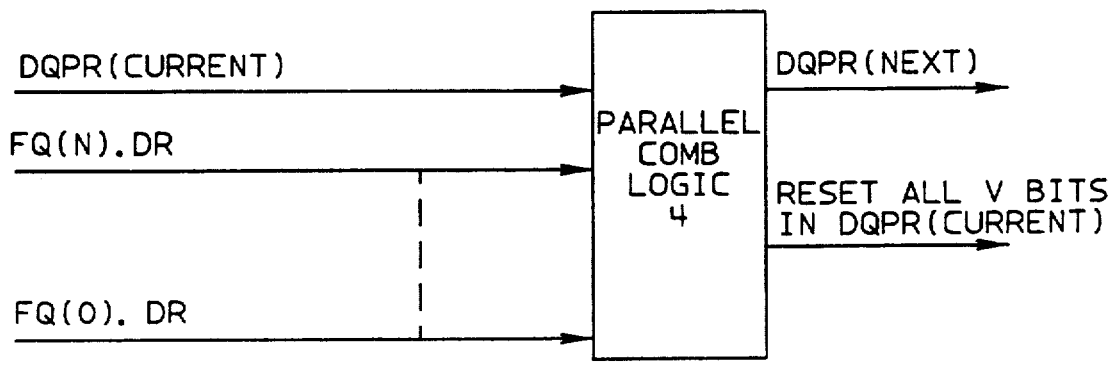
FIG. 15 is a logic diagram illustrating the DQPR control means.

FIG. 14 shows hardware logic for the APR. An AND gate controls the incrementing of an APR counter to the next FQ entry to be allocated. It may be a conventional binary counter circuit. The signals received by the AND gate are: a memory operand signal active while a memory operand instruction is being decoded, a decoder VI signal indicating the writing of an IID into the current FQ entry, and a not VI in current entry signal. The VI in current entry signal is provided through an inverter go the AND gate. Therefore the latter signal is initially in an off state (while VI has not yet been written into the entry), the AND gate is disabled as soon as the VI signal is written into the current entry, terminating the incrementing signal to the APR counter which is then pointing to the next FQ entry to be allocated.

One or more FQ entries may be allocated by the APR operation for an instruction within a single machine cycle. Each entry allocation may be described by the following expressions:

If current FQ(APR).VI = 0 and DECODER VI SIGNAL = 1
    and MEMORY OPERAND SIGNAL = 1,
Then, set current FQ(APR).VI to 1,
Set FQ(APR).IID to Current DECODER IID,
Set next APR pointer to current APR pointer + 1
    (with wrap-around)
End.

AGEN and OSC OPERATIONS

Address generation (AGEN) of each memory operand's effective address (EA) is started as soon as the instruction decoding process detects a storage operand and that an AGEN circuit is available. The decoding process provides to the assigned AGEN circuit the operand's B, X, and D values, the IID, and the operand number. If a required B or X value is not yet available, the AGEN process is delayed until all address components are available. When the AGEN process completes for an operand, the FQ is searched for an FQ entry containing an IID and operand number equal to those stored for the generated EA. The EA is written into the found FQ entry and its VE bit is set to 1 state to indicate the validity of its EA field.

As soon as the effective address is generated for an AGEN operation, an operand store compare (OSC) process is done in the store queue (SQ) for the AGENed EA to determine if a conflict exists with an incomplete prior store request. The OSC determination compares the AGENed EA with the EA in every valid SQ entry having an earlier IID. This OSC search is preferably done in parallel on all SQ entries at the same time, for CPU performance reasons.

If the OSC operation finds the AGENed EA is not equal to the valid EAs in all SQ entries having older IIDs, the V(OSC) bit is set to 0 in the FQ entry receiving the AGENed EA to indicate its fetched data has no OSC conflict. But if the EA in any SQ entry with an older IID is equal to the AGENed EA, a conflict is detected and the FQ entry has its V(OSC) bit set to 1 and its OSC IID field is set to the IID found in the OSC conflicting SQ entry. The conflict may be an overlap with a variable-length data unit in the store buffer (SB), as well as with the same size data unit. Hence, the OSC section in the FQ entry thereafter indicates if the represented fetch request is awaiting a change in requested data from any prior store operand.

NAPR (Next Actual Pointer Register) OPERATIONS

As soon as a fetch request is made in a queue of L1 cache requests (not shown) by the current NAPR selected FQ entry, the NAPR pointer is changed to point to another FQ entry. The next NAPR pointer selects the oldest ready FQ entry needing a memory request for a data fetch (e.g. an L1 cache request). When NAPR is changed to point to another FQ entry, that entry is then used to make a fetch request to the L1 cache, and so on.

The NAPR content is set equal to the NIPR content, and initially both NAPR and NIPR point to FQ entry 0. As long as NAPR and NIPR move together, with both pointing to the same FQ entry, the fetch operands are being requested in conceptual sequence. The NAPR and NIPR will point to different entries when fetch requests get out of sequence.

Thus, as soon as a fetch request (FR) is made, the NAPR setting is changed to point to another FQ entry having no memory fetch yet requested, a valid EA, and no OSC conflict. If more than one FQ entry meets these conditions, the oldest FQ entry meeting these conditions is selected. That is, the oldest FQ entry in such group will be the FQ entry with the lowest IID value (adjusted for any wrap-around;.

Figure 12:
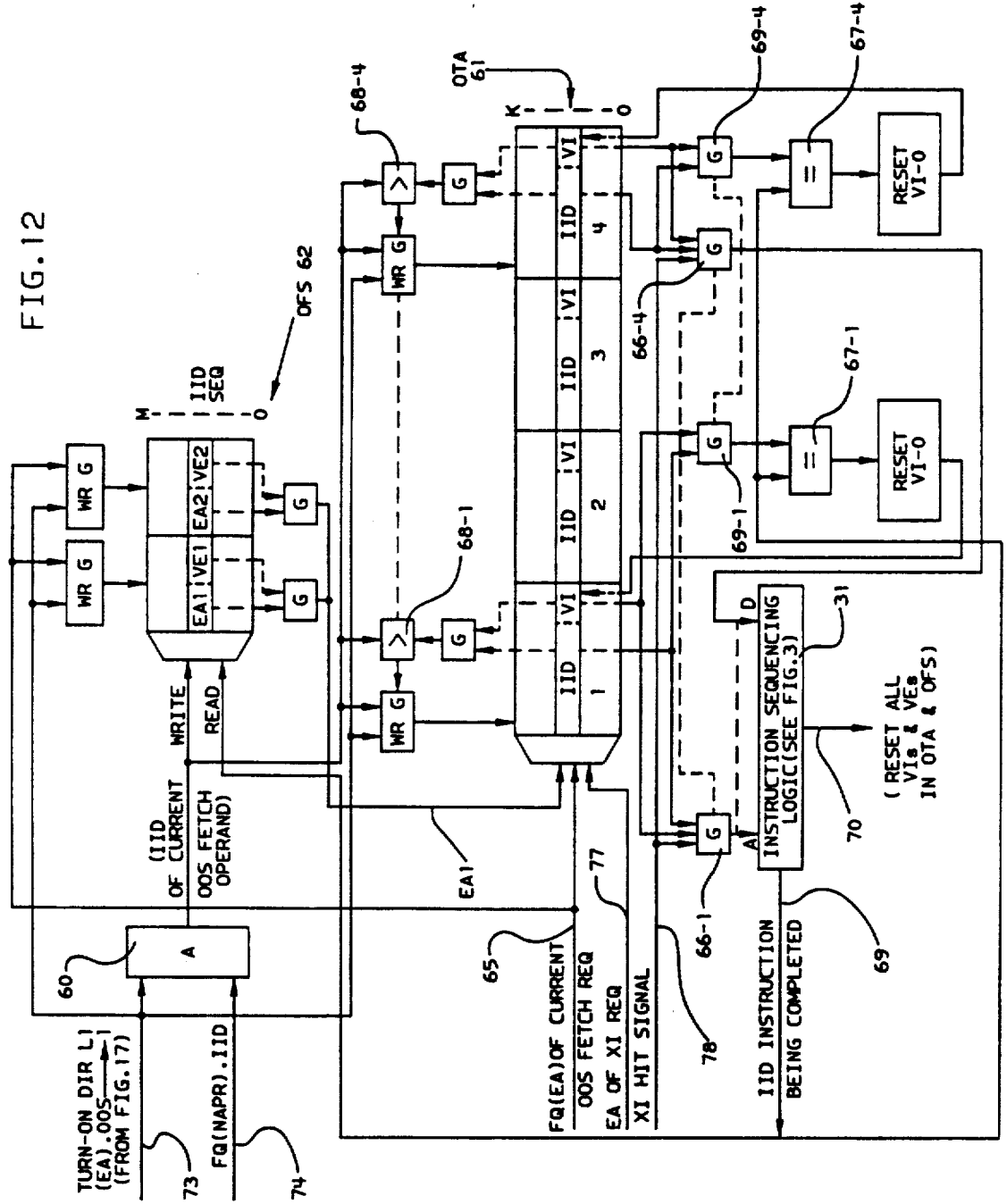
FIG. 12 illustrates an embodiment using the OOS IID fields shown in FIG. 11.

The NAPR operation is preferably done within a single machine cycle in the parallel combinatorial logic circuits 2 shown in FIG. 12, which may be described by the following expressions:

Detect every FQ entry containing VE=1 AND FR=0, and
    FSB & OSC are either both 0 or both 1.
Set NAPR to location of the oldest detected FQ entry, -continued
Make L1 fetch request for this NAPR FQ entry,
Set FR bit to 1 in this FQ entry, and
End.

Figure 13:
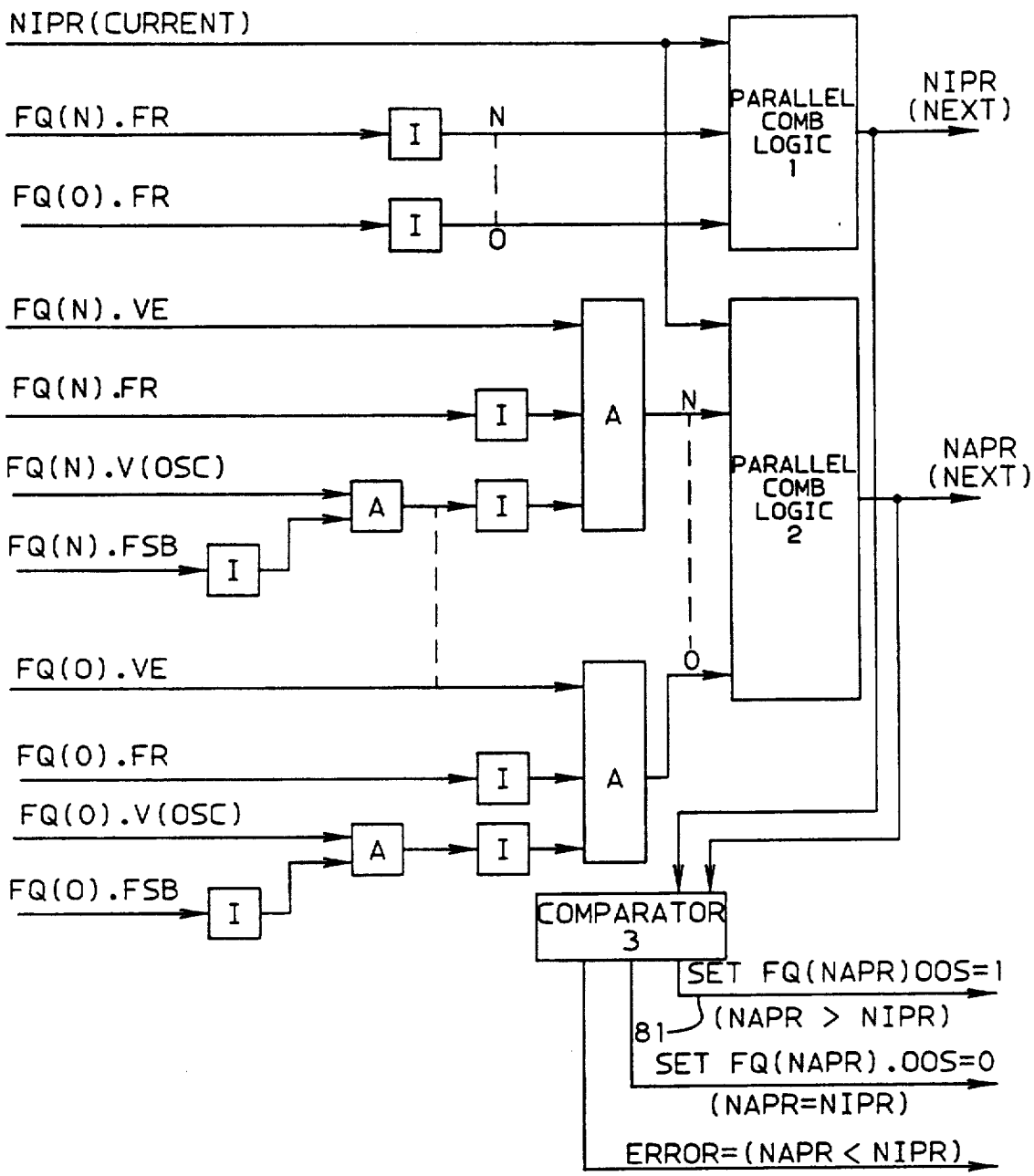
FIG. 13 is a logic diagram illustrating the NAPR and NIPR control means used with the OOS bit and OOS IID embodiments.

In FIG. 13, a parallel combinatorial circuit 2 receives the parallel outputs of a plurality of AND circuits, one for each FQ entry in the FQ hardware. Each AND circuit respectively receives the states of the VE, V(OSC) and FR bits in its corresponding FQ entry. One of these AND circuits will immediately get a hit in circuits 2 after another FQ entry changes its state (to VE=1 and V(OSC)=0 and FR=1) to indicate which FQ entry location should be the next NAPR value.

Thus, the NAPR will not point to any FQ entry: containing FR=1 (which indicates a memory request was previously made for that entry), or containing V(OSC)=1 and FSB =0, (which indicates an OSC conflict is unresolved for that FQ entry). That is, such FQ entries are not yet in a condition for making a request to memory for their data.

NIPR (Next In-Sequence Pointer Register) OPERATIONS

The NIPR pointer is incremented to select the conceptual sequence of FQ entries in the sequence of instructions in the executing program's instruction stream. To do this, the NIPR pointer selects the oldest FQ entry still having its fetch-requested (FR) bit set off to the 0 state. Thus FR=1 for any valid FQ entry older than the NIPR entry. The NIPR pointed entry need not have a valid EA, i.e. VE=0 or VE=1.

NIPR is sequentially incremented to the next FQ entry having FR=0 when the current NIPR entry makes a fetch request, i.e. has its FR bit changed from 0 to 1. The NIPR value will continue to increment through each next following FQ entry having FR=1, until it reaches an entry with FR=0. Thus the NIPR can increment through any number of FQ entries in a single NIPR operation. In one machine cycle, the NIPR pointer value may sequentially move up the FQ (including wrapping) by more than one FQ entry, passing through one or more entries having the FR=1 state previously set by a NAPR operation.

FIG. 12 includes a parallel combinatorial circuit 1 that receives the parallel outputs of the inverted FR bits from all N+1 FQ entries. Combinatorial circuit 1 receives the current NIPR value and outputs the next NIPR value. The NIPR operation is described by the following expressions:

When current FQ(NIPR).FR = 1
Continue to set next NIPR pointer to current NIPR
    pointer+1 (with wrap-around)
End when next GQ(NIPR).FR = 0.

Accordingly, NIPR is incremented only when its currently selected FQ entry has its FR bit changed to a 1 state, as the result of a NAPR operation indicating a fetch request for that FQ entry. However, NAPR can change to any entry meeting its conditions, which can occur while NIPR is pointing to the oldest entry with no fetch request. NAPR then points to the newest out-of-sequence fetch request.

The NIPR changes only in the increasing direction of FQ entry locations with wrap-around, unlike the NAPR which can skip FQ entries while moving either up or down the FQ. Thus, the NIPR value cannot be greater than the NAPR value.

DQPR (Dequeuing Pointer Register) OPERATIONS

In FIG. 4, a dequeuing operation is done for a FQ entry having its fetching completed. The DQPR selects the FQ entry next to be dequeued and made available to the APR for allocation as a new FQ entry. Accordingly, the APR pointer is allowed to be equal to, but is not allowed to be greater than the DQPR pointer in the increasing direction of FQ entries adjusted for wrap-around.

DQPR is set to the oldest FQ entry not having data returned from the cache, or from memory through a cache bypass. Data return is indicated by setting an entry's Data Return (DR) bit to a 1 state.

FIG. 14 shows circuits for obtaining the DQPR operation. It includes a parallel combinatorial circuit 4 that receives the current DQPR value and the parallel outputs of the DR bits in all N+1 FQ entries. The DQPR(next) output of the combinatorial circuit 4 selects the next FQ entry to be dequeued. Another output initializes the DQPR(current) entry, including effectively resetting to off state all of that entry's fields and flag bits. The DQPR parallel operation in FIG. 14 may be done entirely within a single machine cycle as described by the following expressions:

```
Detect each next FQ(DQPR).DR = 1
Invalidate the FQ(DQPR) entry by setting all valid
    bits to 0
End when FQ(DQPR).DR not = 1, leaving FQ(DQPR)
    pointing to oldest FQ(DQPR).DR = 0.
```

More than one FQ entry may be dequeued in a single cycle if the DR bit is on in more than one FQ entry.

OOS (Out-Of-Sequence) DETECTION

The OOS bit in an FQ entry is set to a 0 state to indicate its fetch request is in sequence, but it is set to a 1 state to indicate the request is out-of-conceptual-sequence.

FIG. 12 represents the OOS detection process in the preferred embodiment with comparator 3 receiving the contents of NIPR and NAPR. OOS detection occurs when the NAPR pointer becomes greater than the NIPR pointer (adjusted for wrap-around). This OOS detection indicates when NAPR is pointing to an "OOS fetch" request, since the NAPR pointed entry is requesting its data from the cache earlier than it would have been requested if it were requested in its conceptual sequence (at the NIPR pointer). The current NIPR entry does not yet have data requested, while an OOS NAPR entry has data requested.

Accordingly, each time NAPR receives a new pointer value, a comparison is made between NIPR and NAPR. If NAPR is greater than NIPR, the OOS flag bit is set to 1 in the entry pointed to by NAPR to indicate it represents an out-of-sequence request, signalling $FQ(NAPR).OOS=1$ on line 81. When NAPR equals NIPR, the OOS flag bit is set to 0 to indicate it represents an in-sequence request. The operation of NAPR does not let it become less than the NIPR pointer; an error condition exists if the NAPR pointer is less than the NIPR pointer.

DATA FETCH OPERATIONS

The IID and operand number (IDFO) is a tag which maintains its association with its data while the data is being accessed in storage, so that the IDFO can be sent back to the execution unit with the returned data.

Signals communicated between the FQ and the L1 and L2 caches include the fetch request signals from the FQ to the L1 cache and cache responses. They include electrical lines for FQ entry signals such as: the Fetch Requested (FR) signal line, EA, IID and operand-number signal lines for requesting an L1 fetch. Response lines include electrical lines, such as: data return (DR) and IID and operand-number signal lines, EA lines, a cache miss signal line, etc. When a data return signal is received with the associated operand identifiers from the cache, the DR bit is set on to 1 state in the FQ entry having the same EA and IID as the cache data is transmitted to the CPU's execution unit.

FETCH REQUESTS FOR STORE REQUESTS

Most data store requests do a preliminary data fetch so that the store operation can be done in the fetched data unit. The "store control" field in each FQ entry has a subset of fetch control bits related to store requests. When the "SQ-fetch-request" bit is set to 1 state, it indicates the FQ entry is made for a store request in the SQ. The "SQ-fetch-request" bit is set on to a 0 state if this FQ entry was not made for a store request.

But no preliminary data is necessary when a store request is to store an entire data unit. This no-data-needed condition is indicated by the "fetch-no-data" bit being set to the 1 state.

That is, fetched data is only needed for a store request if less than an entire data unit is being stored. Then, the stored data is merged into the previously-fetched data unit at byte or word locations in the data unit indicated by 1 bits in a "merge mask" field, in which 0 bits indicate unchanged locations in the data unit. The "merge mask" field is found in the corresponding SQ entry (having the same EA, IID and operand number).

In this embodiment, the fetched data unit from the L1 cache is put into the assigned SB location, and the store merge operation is done in an assigned Store Buffer (SB) location assigned to each SQ entry.

The "fetch-no-data" bit is set on to a 1 state when the "merge mask" field in a corresponding SQ entry has all of its mask bits set on to 1 state (indicating the entire data unit in the SB will be provided by the execution unit, which eliminates the need for any preliminary fetch of the data unit into the SB, and any data merge.

The "data-in-SB field" contains any location in the store buffer (SB) from which the entire requested data unit represented by this FQ entry may be more quickly fetched by a later fetch request than from L1 cache.

If the "SB available bit" is set to 1, it indicates the SB contains the entire data unit requested by this FQ entry, and then the "data-in-SB" field locates the data unit in the SB. If set to 0, it indicates the SB does not contain the entire data unit requested by this FQ entry, so that the data unit must then be accessed in the L1 cache.

OOS HANDLING IN A MULTIPROCESSOR (MP)

Computer architecture requires that out-of-sequence (OOS) operand fetching by any CPU in an MP must not cause any change in the results of program execution. But OOS operand fetching may violate this architectural requirement in an MP system. This invention prevents OOS operand fetching from changing the program results, so that the architectural requirement can be met under OOS fetch conditions.

The OOS problem occurs in an MP if one CPU makes an OOS fetch request for data which is being changed by another CPU, whereby different data is obtained from the other CPU by the OOS fetch than would be obtained from the other CPU if the same fetch were in-sequence.

In a MP, a cross-invalidate (XI) signal is sent to all other CPUs when data is changed by any CPU. The OOS fetch problem occurs if data is changed by a remote CPU while the requesting CPU is handling the fetch request out-of-sequence. The period during which a CPU is handling a fetch request out-of-sequence is herein called an "OOS fetch window". This is the period of exposure to the OOS fetch architectural violation.

This OOS problem may be explained using FIGS. 18(A) through 18(E), which show fetch and store operations during time cycles 1–6. The notation F represents a fetch, S represents a store, and (A) (B) (C) (D) (E) (F) represent different address locations in system storage. Thus F(A) represents a fetch of data from storage location A. And S(E) means a store of data into location E.

Figure 18:
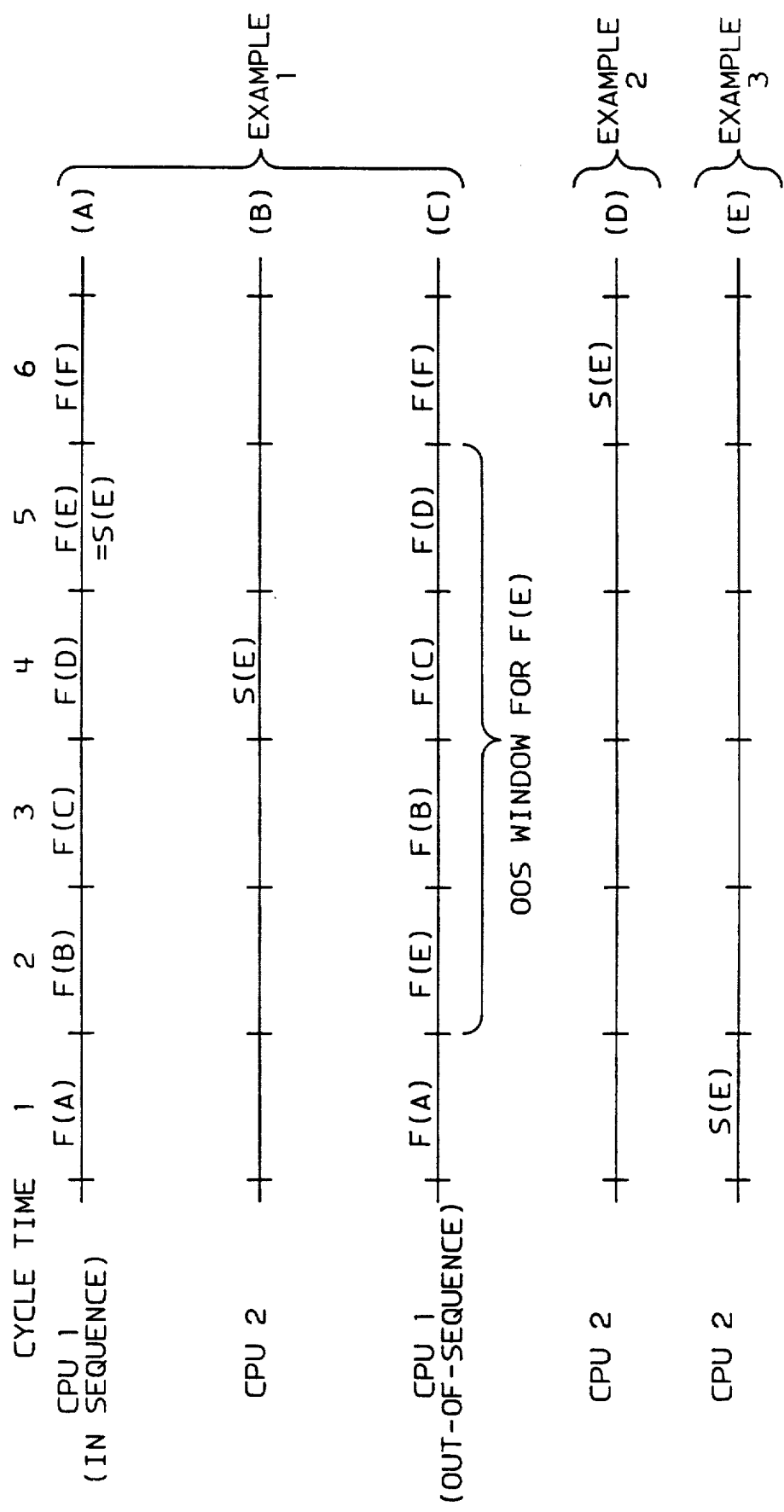
FIG. 18 contains cycle timing diagrams for illustrating an example of an OOS window.

FIG. 18(A) shows in-sequence fetching by CPU 1 in an MP. Its operand data fetches are conceptually sequenced as F(A), F(B), F(C), F(D), F(E), F(F) during the six time cycles. FIG. 18(B) shows a store S(E) by CPU 2 into location E during cycle 4.

CPU 1 operating with the in-sequence fetches in FIG. 18(A) has a fetch F(E) in cycle 5 for data at location (E) that gets a XI hit, fetching data S(E) stored by CPU 2 during the prior cycle 4. In the example, F(E) in CPU 1 obtains data S(E) from CPU 2, and that data is not affected by any OOS fetch since none existed.

The OOS problem is represented in FIG. 18(C) in relation to the FIGS. 18(A) and 18(B). FIG. 18(C) shows OOS fetches F(E), F(B), F(C), F(D) respectively by CPU 1 in cycles 2 through 5, and CPU 1 does in-sequence fetches F(A) and F(F) in cycles 1 and 6. Thus OOS fetch F(E) is made early to location E during cycle 2 in relation to the in-sequence fetch F(E) in FIG. 18(A). The early fetch F(E) obtains the data in location E before it is changed in cycle 4. Thus the CPU 1 OOS fetch F(E) in FIG. 18(C) obtained UNCHANGED data F(E), but the SAME CPU 1 fetch F(E) made in-sequence in FIG. 18(A) obtained CHANGED data S(E).

FIG. 18(C) shows the "OOS fetch window" for F(E), which is the period of OOS fetch data integrity exposure in an MP, during which a requesting CPU can fail to get data which could have been changed if fetched in-sequence. The end of this window occurs at the end of cycle 5, when F(E) occurs in FIG. 18(A) in its conceptual sequence. This OOS fetch exposure window for F(E) hence exists only during cycles 2–5 in FIG. 18(C).

FIG. 18(D) shows data S(E) stored by CPU 2 in cycle 6, after the OOS fetch window ended for F(E) in CPU 1. There is no OOS exposure here. On the other hand, FIGURE 18(E) shows store S(E) occurring in cycle 1, which is before the window. Hence, the cycle 2 OOS fetched data F(E) in FIG. 18(C) also would not be affected by the CPU stored data S(E) in cycle 1 of FIG. 18(E), which is architecturally permissible.

A solution to the OOS fetch problem provided by this invention is to communicate to any CPU requesting an OOS fetch in an MP of the occurrence of a store request to the data unit being fetched in storage by any other CPU during the OOS fetch window of the fetch request, so that the fetch requesting CPU can avoid getting the wrong data for the OOS fetch.

This invention provides plural embodiments for avoiding the MP problem with OOS fetches. These different solutions have different operating characteristics that result in different system efficiencies. In general, they allow trade-offs of hardware simplicity and cost versus operating efficiency.

The embodiments each provide a hardware table lookup means associated with the L1 cache directory in each CPU in an MP, so that the OOS fetch condition of this invention can be searched as part of a conventional XI search of an L1 cache.

Figure 9:
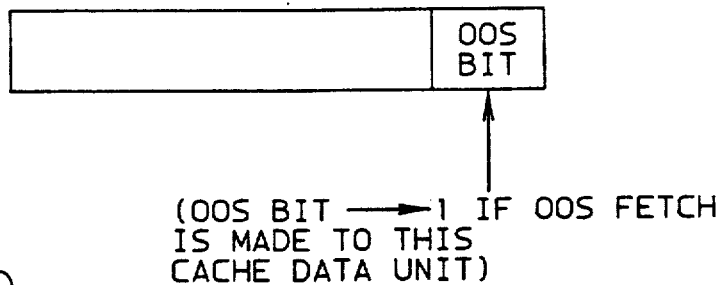
FIG. 9 illustrates an OOS bit field associated with each cache entry for one embodiment of the invention.
Figure 10:
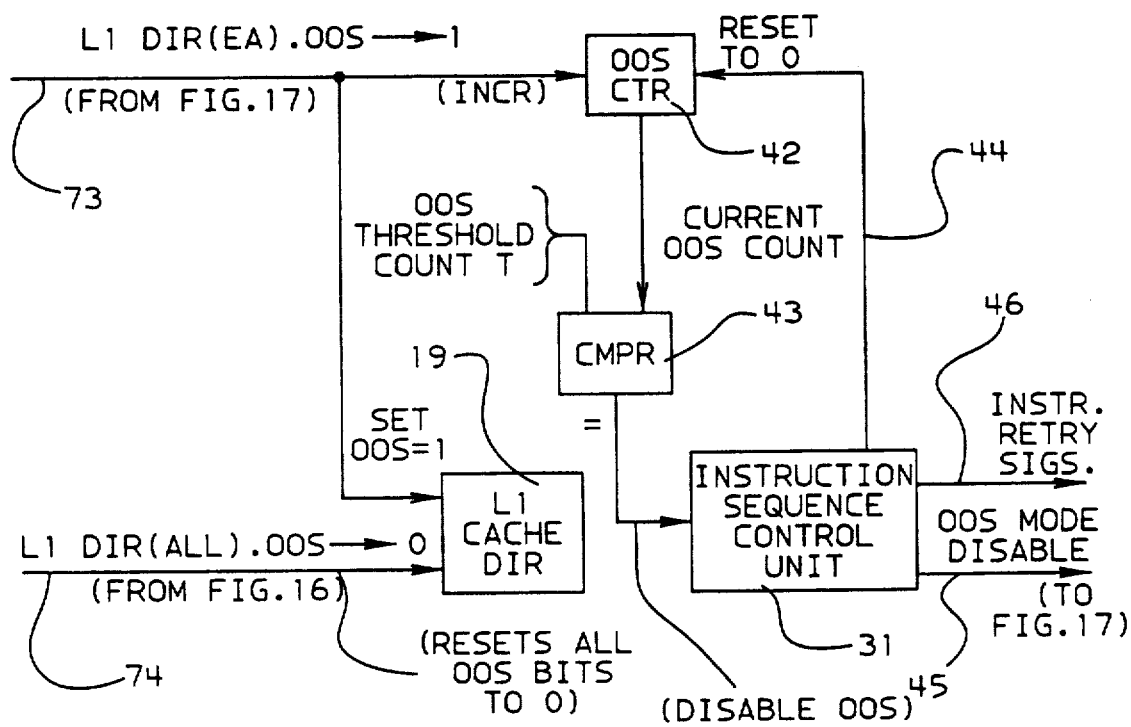
FIG. 10 illustrates an embodiment using the OOS bit fields shown in FIG. 9.
Figure 11:
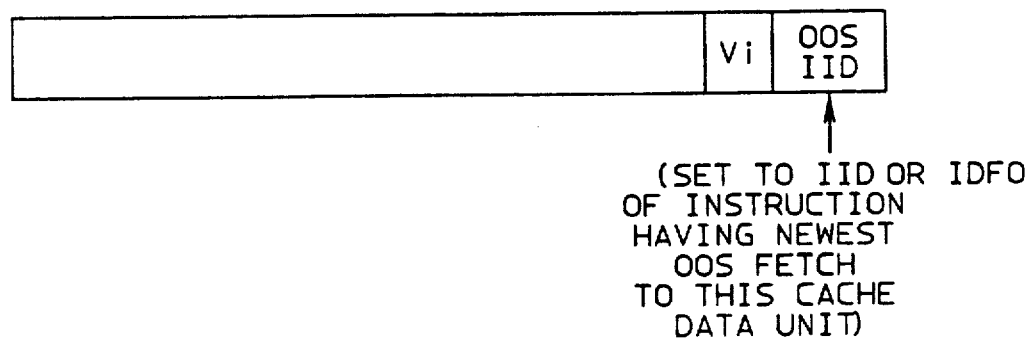
FIG. 11 illustrates an OOS identifier (OOS IID) field associated with each cache entry for another embodiment of the invention.

FIGS. 9 and 11 show different types of OOS fetch indication fields used in two different XI OOS embodiments. These OOS fetch indication fields are added to otherwise conventional L1 cache directory entries that are selected by using their effective addresses (EAs). The first described embodiment uses the OOS fetch indication field shown in FIG. 9, and the second XI OOS embodiment uses the more precise XI OOS field in FIGURE 10.

Each FQ request to its private L1 cache directory provides the EA in the FQ entry to locate a congruence class (row of set-associative entries) in the L1 directory. One of plural L1 directory entries in the addressed row is assigned to each fetch request, and the entry contents are generated in the conventional manner of generating cache directory entries.

In addition for each embodiment, a cache entry OOS indication field is set on when a fetch request is made to the cache entry with the OOS bit=1 (set on) in the requesting FQ entry. The OOS bit is set on and off, respectively, before the beginning and after the end of the OOS fetch window for its OOS fetch request. The second embodiment is preferred because it is capable of resetting the L1 XI OOS fields closer to the end of the OOS fetch window, resulting in potentially fewer instruction retries and better CPU execution efficiency.

If any XI hit should occur to any L1 cache entry having its OOS field set off (to 0 state for no OOS condition), that entry is handled by the conventional rules for an XI-hit, which do not consider the OOS state of the associated data.

But if an XI hit should occur to any L1 cache entry having a valid OOS field (set to 1 state), the entry is handled according to the rules of this invention requiring a retry of, at least, the instruction requesting that OOS fetch operand data.

For the described embodiments, each L1 cache is of the store-thru type, and a common L2 cache of the store-in type is provided as a backing store for all CPU L1 caches in the MP. The data in each CPU's L1 cache is also found in the common L2 cache. The common L2 cache is used by all CPUs in the MP for transferring XI-hit data from the L1 cache of one CPU to the L1 cache of another CPU that wants exclusive control over the data for storing into it. Conventional flag bits (not shown) for each data unit (i.e. data line) represented in any L1 cache directory may be set to indicate the existence of its CPU's exclusive/nonexclusive control over an L1 cache data unit. Invalidation of an L1 cache data unit involves setting off a valid bit in a cache directory entry to indicate the data unit no longer exists in the L1 cache. The related L2 data unit is not invalidated when a corresponding L1 data unit is invalidated in response to a XI hit, since the L2 line thereafter must continue to back up the corresponding data for another L1 cache in the MP. (An L2 data unit may be larger than an L1 data unit.)

The L1 cache OOS flag fields may be organized into a special array addressed by the conventional L1 cache addressing means, so that an L1 entry's OOS field is addressed whenever its respective L1 entry is addressed. The common addressing of separate hardware arrays obtains the logical entry relationship among them so that the array having the OOS fields is part of the L1 cache entries, and they logically operate as if they are in the same array. But by using a separate smaller arrays for various types of fields in the cache directory entries, a particular type of field, such as the OOS fields, can be set and reset faster than can a single large array equal to all of its component arrays providing respective parts of the cache directory.

A change bit is set on in the L2 directory entries when the accessed cache data unit is written into, to inform any requestor that the data unit was changed. If any CPU wants to write into the data unit, it requests exclusive authority over the data unit, resulting in an exclusive bit being set in its entries in the L1 and L2 directories; and an XI request is made to each other CPU to invalidate any copy of the data unit by sending the EA of the data unit. This XI address is used to address each L1 cache directory in the system to access any valid set-associative entry representing that address. If a valid data unit is found in another L1 cache, it is invalidated by the XI request, whether it is marked OOS or not.

If an OOS mode signal is received in FIG. 5 and a local cache miss occurs, it will be indicated to the FQ in the next machine cycle to set on the cache miss bit in the FQ. The NAPR addressed entry will have its OOS bit set to 1 only if NAPR is greater than NIPR. The "data return" bit in the FQ entry is set to 1 state when the data for the current L1 miss has been received from the cache by the execution unit. Then, the current L1 miss state is turned off in the FQ entry. While any cache miss bit is on in the FQ for each new NAPR request to L1, the OOS bit in the addressed L1 cache entry is set to 1 state.

XI OOS BIT EMBODIMENT (FIGS. 9, 10 & 17)

FIG. 10 supports a method using the OOS flag field in FIG. 9 in each L1 cache entry. Here, the OOS flag field is a single bit in the directory entry addressed with the EA in the requesting FQ entry. An L1 entry's OOS field (located by a particular EA) is referenced as L1 DIR(EA).OOS. The OOS bit is set on (to 1 state) by a signal on line 73 from FIG. 17. At any one time several valid L1 cache entries can have their OOS bits set to a 1 state, and the remaining valid cache entries then have their OOS bits set off (to 0 state).

Figure 17:
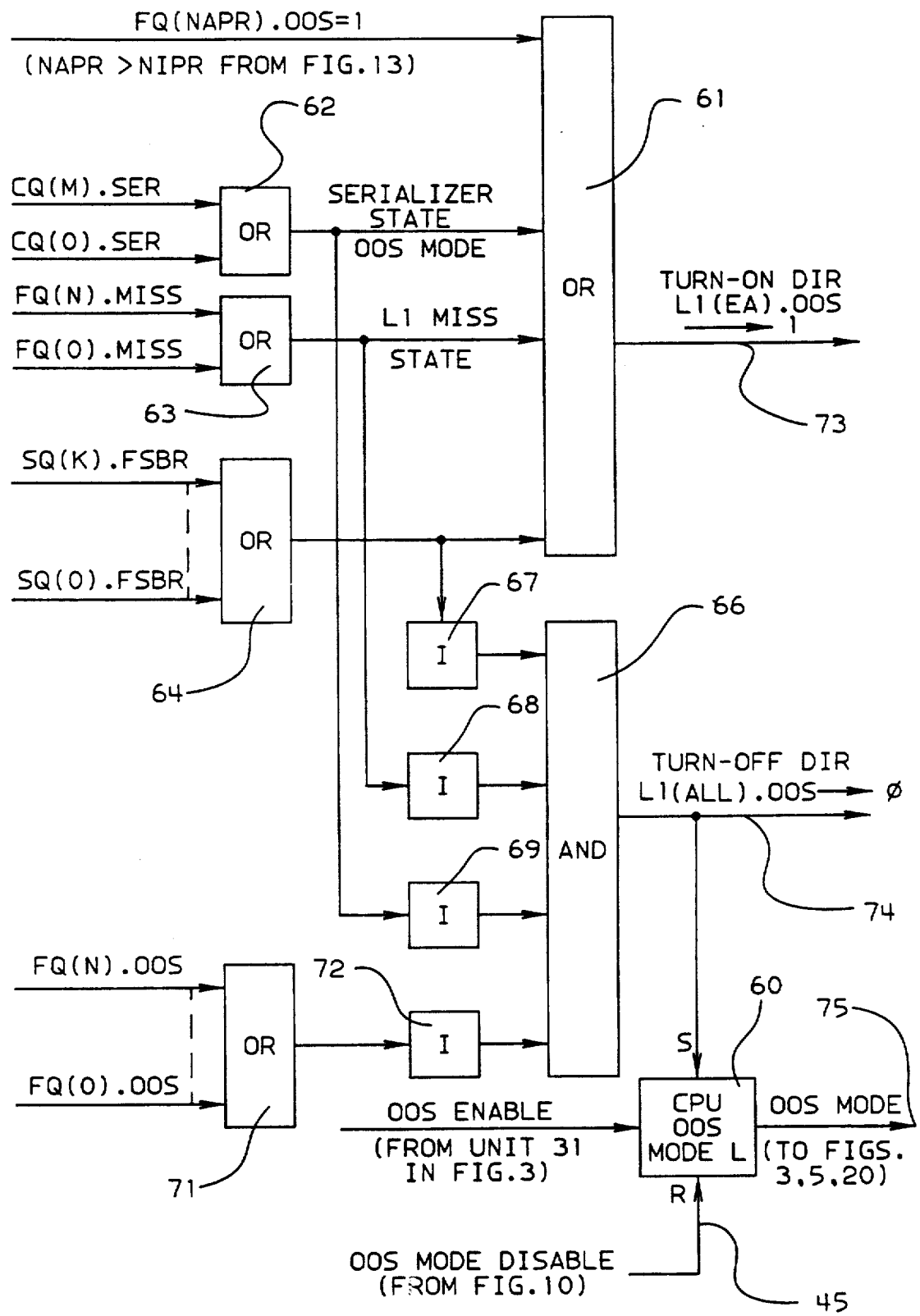
FIG. 17 is a diagram illustrating the logic for setting and resetting the L1(EA).OOS bits.

FIG. 17 has a CPU OOS mode latch 60. Its on state indicates the CPU may use OOS fetching. Its off state inhibits CPU use of OOS fetching. For the first XI embodiment, it is set on each time all L1 OOS fields are set off to 0 in the L1 cache directory by an output from AND gate 66, and a signal on line 40 has no effect. And in the first embodiment, Latch 60 is set off by an OOS disable signal on line 45 in FIG. 10 when the threshold count is reached. For the second XI embodiment, an OOS enable signal on line 40 is received from instruction sequence control unit 31 in FIG. 3, latch 60 outputs its OOS mode signal, and its S and R inputs have no effect on the latch state.

An addressed L1 OOS bit is set on to a 1 state by a signal L1 DIR(EA).OOS→1 from an OR circuit 61, which can be actuated by any one of a number of different signals. OR circuit 61 is actuated by the FQ(NAPR).OOS=1 signal on line 81 from FIG. 13, or the output of OR gates 62 or 63, or the output of an OR circuit 64. OR circuit 62 is enabled by a serializer bit in the completion queue entry in FIG. 19, i.e. CQ(0).SER through CQ(M).SER. The OR gate 63 is enabled by an L1 miss state signal on line 28 from FIG. 5 in the FQ entries, i.e. FQ(0).MISS through FQ(N).MISS. OR circuit 64 passes the on state of the fetch-SB-return (FSBR) bit in any SQ entry, i.e. SQ(0).FSBR through SQ(K).FSBR in the store queue, wherein an early fetch may be obtained from an SB.

AND gate 66 outputs the signal L1 DIR(EA).OOS→0 that turns off to a 0 state all L1 OOS bits in L1 cache directory. AND gate 66 receives the inverted outputs of AND gates 62 and 63, and the inverted output of OR circuit 64. Also, AND gate 66 receives an an inverted output of an OR circuit 71 indicating no OOS fetch condition exist in the FQ. OR circuit 71 receives the state of every OOS bit in the FQ, i.e. FQ(0).OOS through FQ(N).OOS, to enable gate 66 to turn-off all L1 OOS bits when all FQ OOS bits are off in 0 state.

This embodiment causes a retry of the execution of the program from the oldest incomplete instruction, which reexecutes the instruction having the OOS fetch operand with an XI signal indicative of a possible store by another CPU into the operand's data during its OOS fetch window. The incomplete instructions are retried, so that the refetched operand data avoids being affected by any OOS condition.

Figure 19:
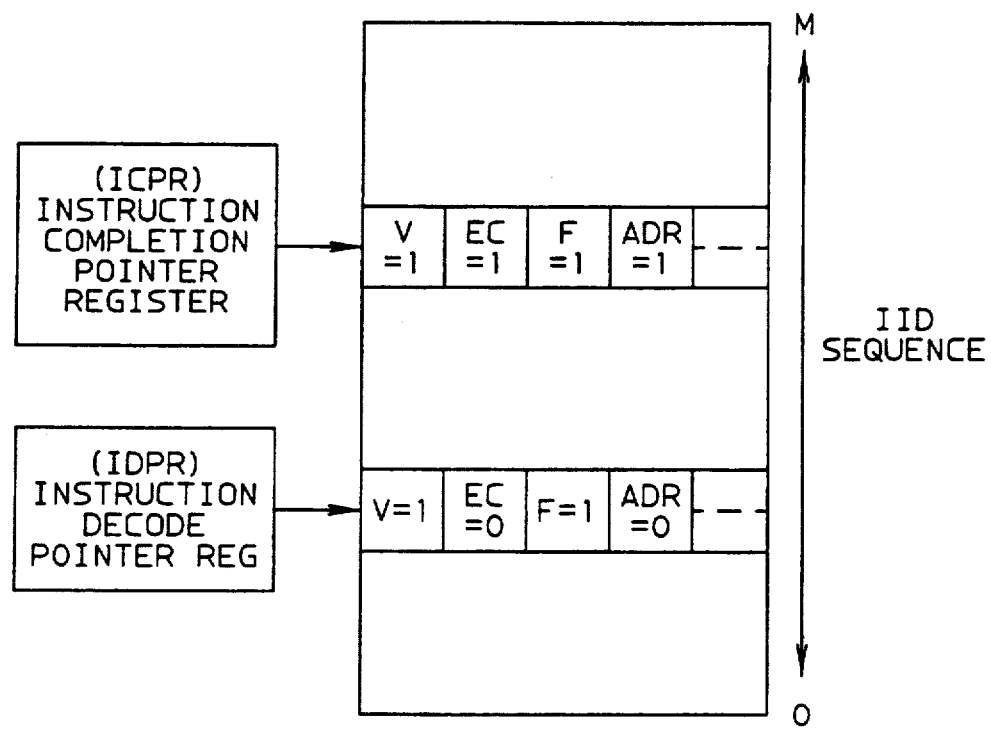
FIG. 19 illustrates the instruction completion queue (CQ) and its pointer registers.
Figure 20:
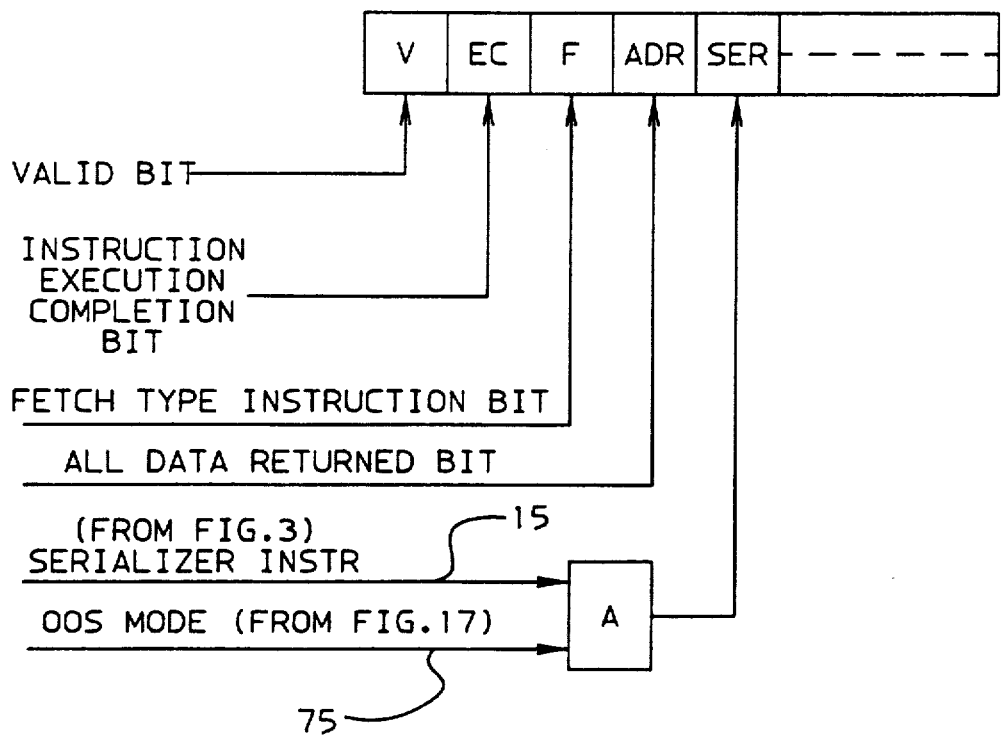
FIG. 20 illustrates fields in a CQ entry.

The IID of the oldest instruction not presently completed in the completion queue (CQ) is identified by ICPR (instruction completion pointer register in FIGURE 19, which is in the instruction sequence control unit 31. The incomplete instructions in the CQ being retried are those identified from the IID in the IDPR (instruction decode pointer register) to the IID in the ICPR. Each incomplete instruction is represented by an CQ entry defined in FIG. 19. Its bit EC is set when the instruction's execution is complete, a valid bit V is set on to indicate the entry represents an instruction, bit F is on when the instruction has one or more fetch operands, and bit ADR is set on when all fetch operands of the instruction have been returned, and bit SER is set on when the entry represents a serializing instruction and OOS mode exists.

FIG. 21 indicates how the IDPR is incremented by an instruction decoded signal from the instruction decoders 12 while the CQ entry currently addressed by the IDPR has its bit V=0, i.e. CQ(IDPR).V=0.

A retry operation is initiated to begin from the current IID in the ICPR on line 69 in FIG. 22 (part of unit 31 in FIG. 3) :;hen an XI hit is signalled from the instruction sequence control unit in FIG. 10 ("Initiate Retry Signal" in FIG. 22). When the ICPR entry has all bits V, EC, F and ADR set on to their 1 states, it increments the ICPR to its next value, and the next ICPR pointer is the IID from which a retry can start upon a current XI signal occurring.

The occurrence of XI-affected fetch operands is expected to be a rare occurrence, so that the economics of the situation indicates that simplicity is desirable for the XI OOS fetch detection hardware involved, even though extra instructions get occasionally retried.

Maximum retry efficiency indicates that all OOS bits should be reset back to 0 state as soon as a retry is initiated.

FIG. 10 provides an OOS-bit reset method for all OOS bits set on in the L1 directory whenever no OOS fetch request exists in the FQ or SQ. So that no inordinately long period of time may elapse before a reset to 0 state occurs, a reset is done upon a sequence of T number of OOS fetches. False OOS indications in L1 can cause unnecessary instruction retries which can reduce CPU efficiency, but they do not affect system integrity.

The circuit logic shown in FIG. 10 avoids having an undue delay in resetting the OOS bits back to 0 by using an OOS counter 42 to count the number of OOS fetch requests at which a reset to 0 may be done. A comparator 43 detects when the OOS count reaches a threshold value T. The OOS counter 42 is then reset back to its zero count in preparation for another cycle of its operation.

Upon reaching count T, the instruction sequence control unit 31 (also shown in FIG. 3) provides an OOS mode disable signal on line 45 for controlling the resetting of the OOS state in the L1 cache. However, no OOS reset occurs as long as unit 31 recognizes that any incomplete OOS fetch request exists in the FQ or SQ due to operation of the reset signal on line 74 in FIG. 17.

FIG. 17 receives the OOS mode disable signal on line 45, which resets the CPU OOS mode latch 60. When reset, the OOS mode signal prevents any OOS fetch requests. The other inputs to AND gate 66 from inverters 67 and 72 remain inactive until no store queue FSBR (fetch store buffer return) bit is on, i.e. all $SQ(j).FSBR=0$, and no FQ OOS bit is on, i.e. all $FQ(j).OOS=0$. When no OOS FQ or SQ input to AND gate 66 is active, gate 66 then provides an output signal, L1 $DIR(ALL).OOS \rightarrow 0$, that turns off to 0 all L1 directory OOS bits. The output 44 from unit 31 then resets OOS counter 42 to zero.

Therefore, the circuit in FIG. 10 delays a reset to 0 of all L1 cache OOS flag fields until after all OOS fetch indications in the FQ are eliminated, such as by successful completion of their instructions.

XI OOS IID EMBODIMENT (FIGS. 11, 12 & 17)

FIG. 12 supports a second embodiment which differs considerably from the first described embodiment for handling XI OOS conditions. FIG. 11 implements the type of L1 entries shown in FIG. 10. OOS mode is set on for latch 60 in FIG. 16 by an OOS enable signal from FIGURE 3, and its S and R inputs are disabled.

FIG. 12 includes an OOS tag array (OTA) 61, an OOS fetch stack (OFS) 62, and instruction completion logic 63 (which is part of the instruction sequencing control unit 31 in FIG. 1).

OFS 62 is needed for the deletion of entries in OTA 61 after the FQ entry with the OTA-entry-selecting EA may have been dequeued. The IID of each completed instruction enables the finding of any valid OTA entry that may exist for the instruction. Since any operand can no longer be OOS after its instruction has successfully completed, its OFS and OTA entries (if any) must then be invalidated. Thus, OFS 62 enables the conversion of a completion IID into an EA for finding an OOS IID entry in OTA 61.

OTA 61 is logically part of the L1 directory, although it is physically separate from the L1 directory arrays for performance reasons previously explained herein. OTA 61 is logically part of the L1 cache directory due to the OTA being addressed simultaneously with the L1 directory by the same cache directory address. (The separation of hardware arrays does not change the logical relationship of the OTA fields to the L1 cache directory entries. By using a separate smaller array, the accessing of OTA fields can be done easier and faster, than if they were physically within the same hardware array with the cache directory entries.)

Accordingly, the OTA 61 has the same number of congruence classes and set associativity as the L1 cache directory. Each congruence class (horizontal row) in OTA 61 contains four columns of set-associative entries that directly correspond to the set-associative entries in the L1 cache. Each entry in OTA 61 is comprised of an IID field and a Valid IID (Vi) field. If Vi is set to 1, its IID field contains a valid IID (in the same entry). But if Vi is set to 0, the associated IID field does not contain any valid IID.

OFS 62 is a hardware array with M+1 number of entries for the OOS IIDs that can be indicated in the L1 cache. A row in the OFS array is indexed by being addressed by the IID of an instruction. Each of the two OFS entries has a different OTA entry. Each entry in OFS 62 is comprised of an EA field and a Valid Address (VE) field. If VE is set to 1, the associated EA field contains a valid address. But if VE is set to 0, the associated EA field does not represent any OTA entry.

Figure 16:
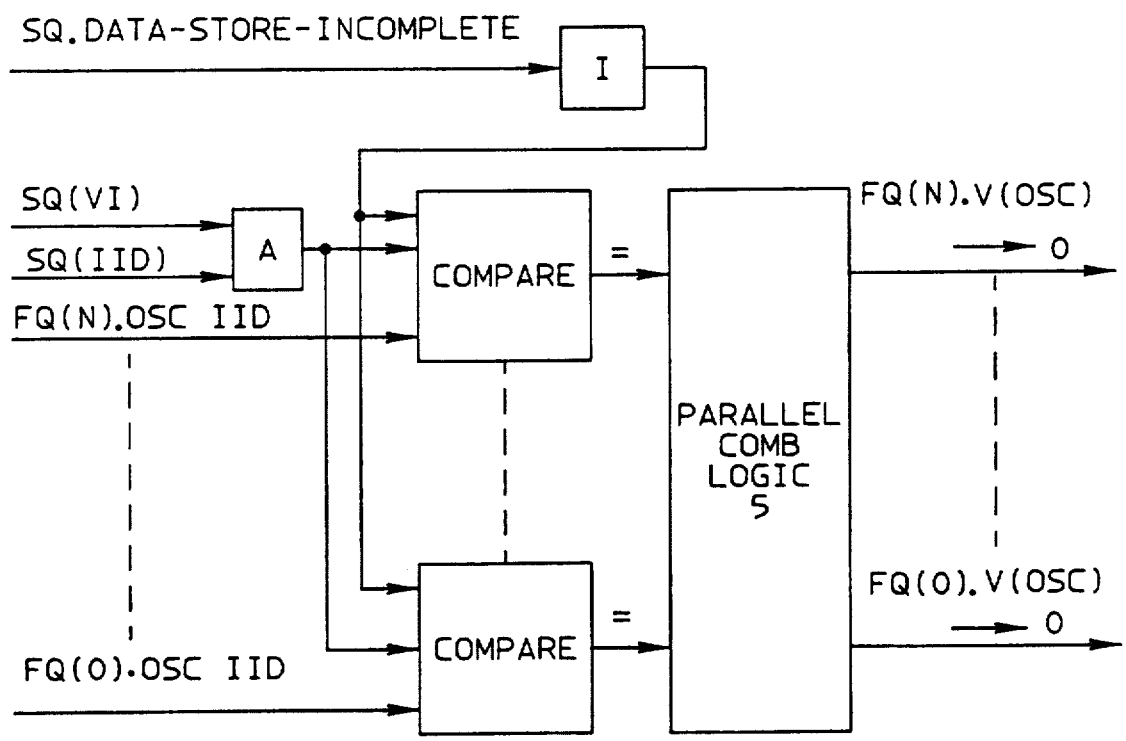
FIG. 16 is a diagram illustrating the reset logic for resetting the V(OSC) bits in the FQ entries.

Whenever an FQ fetch entry requests OOS data in L1, it provides an L1 DIR(EA).OOS=1 signal from FIG. 16 to a gate 60 in FIG. 11 to provide the IID of the requesting instruction on line 74. The IID indexes an entry in OFS 62, and the EA in the FQ entry is written into an available one of the EA1 or EA2 locations in the indexed OFS row having a valid bit VE set to 0, which is then set to 1.

Also, the FQ entry's EA is used to locate the corresponding assigned L1 directory entry in a row in OTA 61, into which is written the requesting IID which is set valid. But if the found OTA entry has its valid bit VI=1, its IID identifies the last instruction with an OOS operand to have accessed the L1 entry's data unit, and the current OOS instruction has a different IID, which is provided to comparators 68-1 to 68-4. If the comparator corresponding to the found OTA entry 68 finds the IID is greater than the valid IID in the found OTA entry, the associated write gate is enabled to write the current IID as a new IID into that OTA entry, and its VI bit remains 1. Thus, the IID may overlay a prior valid OOS IID so that a valid IID in any OTA entry represents the OOS IID for the newest instruction doing an OOS fetch to the associated L1 data unit.

OFS 62 enables the use of a completion IID to look up the EA1 and EA2 addresses of up to a pair of L1 entries (representing up to a pair of fetch operands generated for one instruction) by using the IID of that instruction. The EA is used to find the location in the OTA 62 (and in the L1 directory) of any related OOS fetch entry.

The EA of the FQ request is used to find the cache entry in which to set the OOS fields, IID and VI, when a new OOS FQ request is provided to the L1 cache. It is signalled by AND gate 60 in FIG. 11 when the NAPR circuits cause the fetch request, i.e. FQ(NAPR).IID, while NAPR>NIPR to provide the signal L1 DIR $(EA).OOS=1$. The finding of a required entry in the selected row in OFS 62 uses the provided IID as an index into the OFS array. The provided IID of the instruction addresses the required row and writes the EA in the selected OFS row. The EA in the FQ entry addresses a row in the cache directory for which an OTA entry is assigned by conventional L1 LRU circuitry (not shown). Then the EA is written into the assigned OFS entry and its VE bit is set to 1, and then the IID is written into the found OTA entry and its VI bit is set to 1.

An XI search (using an XI-provided EA) for an L1 entry to be invalidated simultaneously searches for any valid OTA entry. If an XI-hit OTA entry is found, its OOS IID is read through one of the four associative gates 66 to the instruction completion logic 31 to cause an invalidation of all entries in OTA 61 and OFS 62 and a program retry beginning from, or before, the XI-hit IID. The program retry is an execution of the current program beginning with a reexecution (retry) of the instruction identified by the XI-hit IID, or of a prior instruction, in an effort to eliminate its prior OOS problem. The reset is signalled from line 70 and is preferably done simultaneously to all valid bits VE and VI in OFS 62 and OTA 61 as soon as any gate 66 is enabled.

It may be easier to implement the instruction sequencing logic 31 to start the retry process at the oldest incomplete instruction rather than the instruction which has its IID determined from an XI hit to an L1 cache entry. Since all incomplete instructions after the oldest incomplete instruction will also be retried, they will include the instruction having the IID determined by the XI hit. A slight decrease in CPU performance may result due to a few additional instructions being re-executed. When the retry process reaches the instruction that had an OOS fetch operand identified by an XI request, that operand will again be accessed with any required update from the L2 cache. When the retried instructions execute they may have fetch operands that have OOS problems, and OOS entries may again be set in OTA 61 and OFS 62.

The normal operation when each instruction execution is completed is to invalidate any related OOS IID entry in OTA 61 and OFS 62. To do this, the completion IID from unit 31 addresses OFS 62 to access the entry at the IID index. If that OFS entry has its VE bit = 1, the IID represents an instruction having at least one OOS fetch operand in the L1 cache, and its EA is gated out to address a row in OTA 61 and associatively locate the OOS IID entry in that row. That is, one IID in one of the four entries in the row is readout by a set-associative gate 69 with the completion IID detected by one of equal-to comparators 67-1 through 67-4. Thus, if comparator 67 finds an equal IID, that IID is invalidated by resetting its VI bit to 0. If a subsequent OOS fetch by a later instruction with a different IID accesses any valid OTA entry, no equal comparison can be obtained, but one of four greater-than gates 68 is enabled to change the OOS IID to the OOS IID of the later instruction.

OOS SERIALIZATION CONTROLS

A serializing instruction (hereafter called a "serializer") is an instruction causing serialization of CPU operations, as defined in the IBM Enterprise Systems Architecture/370 Principles of Operation (Publication Number SA22-7200-0) pages 5-76 and 5-77 under the heading "CPU Serialization". A number of CPU instructions are listed there which cause CPU serialization (i.e. serializers) such as compare and swap, load PSW, invalidate page table entry, program call, program return, etc.

The architecture of the IBM S/370 serializing instructions required the operands for all previous instructions to be accessed before the operands of the serializing instruction are fetched.

Figure 8:
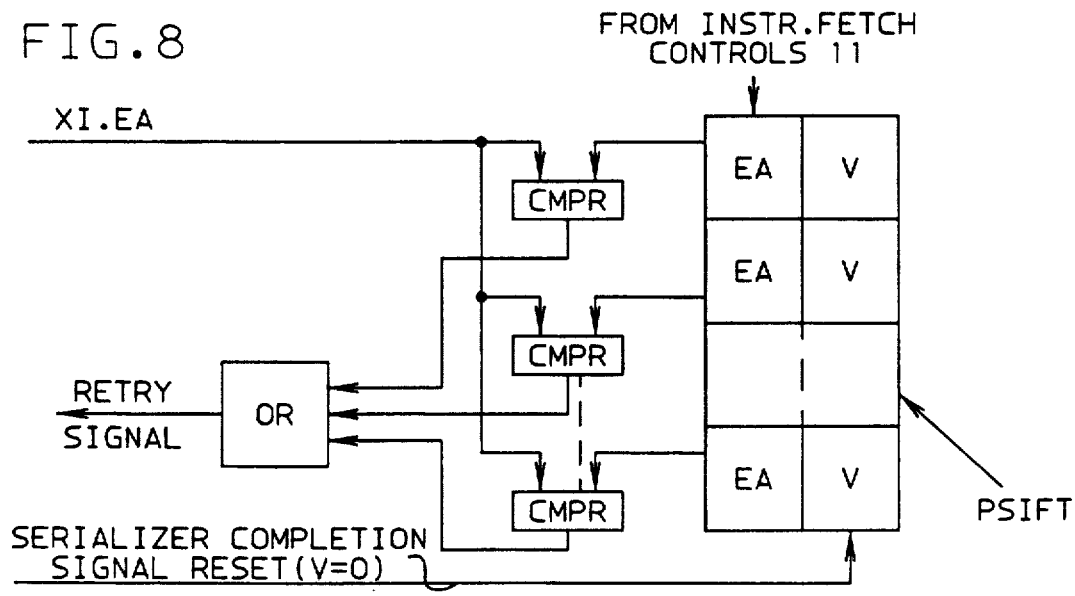
FIG. 8 represents post-serializer instruction fetch (PSIFT) controls.

In addition, the architecture requires the execution of each serializing instruction to be completed, and all of its results visible to the system before its next instruction is fetched for execution. This invention provides a PSIFT (Post-serializer I-fetch Table) to comply with this requirement in an OOS fetch environment allowing XIs. The PSIFT is shown in FIG. 8, in which each entry has an EA and a V field. An entry is made in the PSIFT for each following instruction while the serializer is incomplete. The EA in the entry is the storage address of the represented instruction, and the V bit indicates if the entry is valid. If no XI occurs when the entered serializer completes, all entries in the PSIFT are invalidated in preparation for the occurrence of the next serializer, and instruction fetching continues as if the PSIFT operation did not exist. But if an XI occurs while there are valid entries in the PSIFT, then a retry is signalled if XI.EA (the EA of the XI request) is equal to the EA of any valid entry in the PSIFT, and all entries in the PSIFT are then invalidated.

When a serializing instruction is decoded and OOS mode exists, the SER bit is set on in the completion queue (CQ) entry for this instruction in FIG. 19. If the serializer performs a fetch, its OOS bit in its FQ entry in FIG. 5 is set on. Then, the L1 OOS field in FIG. 9 or 11 is set for each fetch request by each serializing instruction, and also for each fetch request by its following instructions requested while the serializing instruction is incomplete, regardless of whether or not their data for these OOS indicated fetch requests is returned out-of-sequence or is returned in conceptual sequence.

Use of the FQ in FIG. 5 allows fetch overlap in serializer operations. Each fetch operand of a serializer instruction, each fetch operand for all following instructions, and each following instruction fetch, while the serializer instruction execution is incomplete, are considered OOS fetches, each of which has an FQ entry allocated.

The processor may fetch the operands of the serializer and subsequent instructions as soon as it can perform these operations.

Thus, instruction decoding can continue without interruption preceding and following each serializer without waiting for prior fetches and following fetches to complete.

If another serializer is encountered before completion of the currently executing serializer, the next serializer may be delayed until completion of the current serializer.

The output of OR circuit 62 is provided in FIG. 17 as an input to OR circuit 61 to turn on the OOS bit in the EA addressed L1 cache directory entry. Thus all operands are marked as OOS for L1 if decoded for instructions executing while a serializer instruction is executing, including the serializer instruction's operands, and the operands of any overlapping preceding instructions and any following instructions decoded before the serializer instruction's execution is completed.

The L1 OOS field is reset as previously described for the respective XI embodiments.

OOSDT EMBODIMENT

Figure 24:
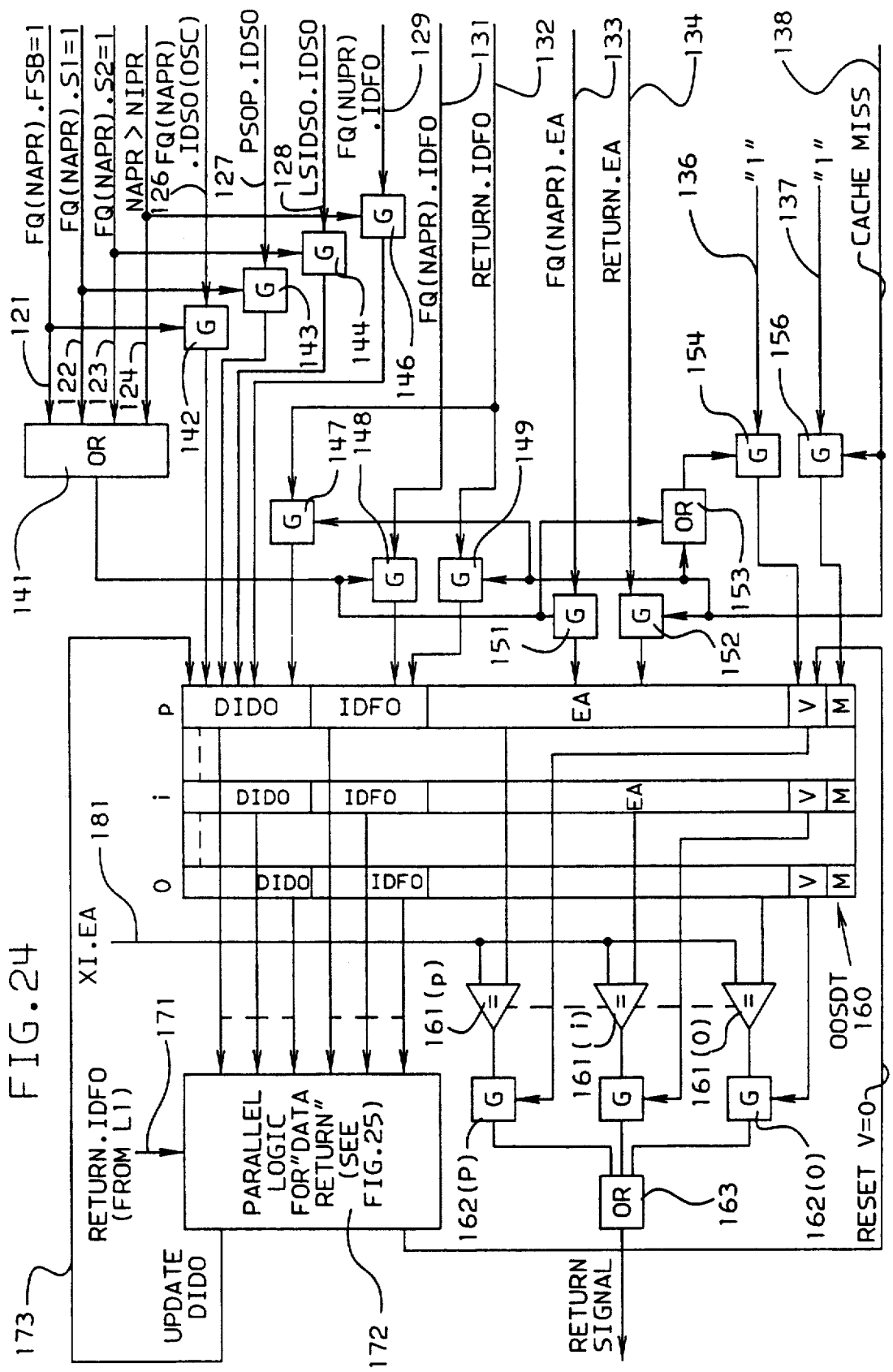
FIG. 24 shows the OOSDT (out-of-sequence dependency table) and its controls.

A third embodiment of the invention uses a fully-associative OOSDT (out-of-sequence dependency table) and is shown in FIG. 24. It enables greater instruction retry efficiency than the prior described embodiments by reducing the detected size of the OOS fetch window of exposure. As previously explained, an "OOS fetch window" is the period during which an exposure exists to an XI occurrence that may cause data fetches by a processor in an MP to violate the integrity of data being OOS fetched. The OOSDT embodiment reduces the size of the OOS window to a minimum size, which has the effect of minimizing the number of XIs that can occur within the OOS windows of fetch integrity exposure.

The OOSDT embodiment effectively provides a detectable OOS window of exposure during each OOS fetch. The OOSDT embodiment uniquely detects a dependency relationship between the OOS fetches that terminates each OOS window when its actual period of exposure ends to detect the minimum OOS windows of exposure.

The prior described embodiments detect OOS windows of XI exposure which may be somewhat larger than the minimum OOS windows needed for fetch integrity protection against XI occurrences. But the other described embodiments may be simpler to build into a computer system so that they may be preferred in some cases. That is, some XI requests detected by the other embodiments during their detectable apparent OOS windows may actually occur outside the actual (minimum) OOS window, and be a false detection of an XI exposure that results in an unnecessary instruction retry for the XI request. These unnecessary retries can reduce the execution efficiency of the CPU, but the extra retries do not affect the integrity of the CPU's execution data results, since a reexecution of any instruction in its proper sequence with its required operands obtains the required execution result.

In the OOSDT embodiment, instruction retry is performed, as is done in the other embodiments, by the instruction sequencing logic 31 restarting the execution of the current program from its oldest incomplete instruction (and not from the instruction that specified the OOS fetch causing the OOS window in which the XI is detected if it is a different instruction).

The OOSDT embodiment detects minimum OOS windows, which exist for shorter periods than the OOS windows in the other embodiments. False XI OOS hit detections has a greater possibility of occurring in the other described embodiments because they do not invalidate a detected OOS fetch state as quickly as the OOSDT embodiment. For example, in the OOS IID embodiment, an OOS exposure window does not end until the instruction is completed having the fetch operand which accessed the exposed OOS data. But in the OOSDT embodiment, an OOS window is ended upon the return of the data for an OOS fetch operand when no dependency is found in the OOSDT. The OOSDT embodiment is more complex and may cost more to implement, and trade-offs must be made to make a selection of the optimum embodiment for a particular MP system design.

In the OOSDT embodiment, a detected OOS window of exposure begins when a valid entry is put into the OOSDT table. The OOS window exists until the entry is invalidated (removed) from the table. Thus, an OOS window is available to an XI occurrence only while a corresponding entry exists in the OOSDT.

Each OOSDT entry has a dependency field DIDO which is used for determining the end of an OOS window. One or more OOS windows may be ended at the same time when no dependency is simultaneously determined for them.

The OOSDT embodiment uses the terms IDFO, IDSO and IDO, each of which is represented by a concatenation of the IID and operand number in an FQE for an operand in an instruction. An IDFO represents an identified Fetch Operand. A IDSO represents a Store Identified Operand. An IDO represents any type of Identified Operand, fetch or store, i.e. an IDO can be either an IDFO or a IDSO.

While an FQ entry exists it is represented by an IDFO. While an SQ entry exists, it is represented by an IDSO. However, an IDFO or IDSO will continue to be remembered in the storage hierarchy for an OOS or quasi-OOS request after its FQ or SQ no longer exists because it was dequeued. The IDFO or IDSO in the storage hierarchy is tagged to its data being accessed so that the IDFO or IDSO can be returned to the execution unit of the requesting processor as soon as the storage access is complete.

Thus, in the OOSDT embodiment, the cache controls remember the IDFO and EA of each cache miss, and they are tagged to the fetched data when it is later returned to the execution unit. Accordingly, an IDFO (RETURN.IDFO) is obtained from the L1 cache controls when the data is to be returned to the execution unit of the CPU. The RETURN.IDFO is sent on line 171 in FIG. 24 to "parallel logic for data return" 172 as the fetched data is provided to the execution unit in the CPU.

FIG. 24 illustrates the OOSDT embodiment, which includes an OOSDT array 160 (a hardware table) and hardware logic circuits that operate with an OOSDT array 160 (hereafter referred to as the OOSDT). OOSDT 160 is a fully associative array allowing associative searching based on parallel compares of a provided value with the contents of selected fields in all entries. Each OOSDT entry has a principle field IDFO, a dependency field DIDO, a storage location field EA, a valid bit V, and a cache miss bit M to indicate when its request to L1 has an outstanding cache miss.

An OOSDT entry is made for each OOS and quasi-OOS fetch request, but not for non-OOS fetch requests. Thus, an OOSDT entry is allocated and made for each FQE having any of the following fields set on: FSB, S1, S2, OSC.IDSO, OOS or M. The OOS bit field is set on (to 1) when NAPR>NIPR, and each of these other FQE fields provides a quasi-OOS state. If any of these conditions exists, the IDFO field in an allocated OOSDT entry receives the IDFO in the FQE currently pointed to by NAPR. It is provided as the FQ(NAPR).IDFO signal on line 131, which is gated into the IDFO field in the allocated OOSDT entry immediately upon issuance of the fetch request to L1, and the FR bit is set to 1 in the FQE.

Figure 23:
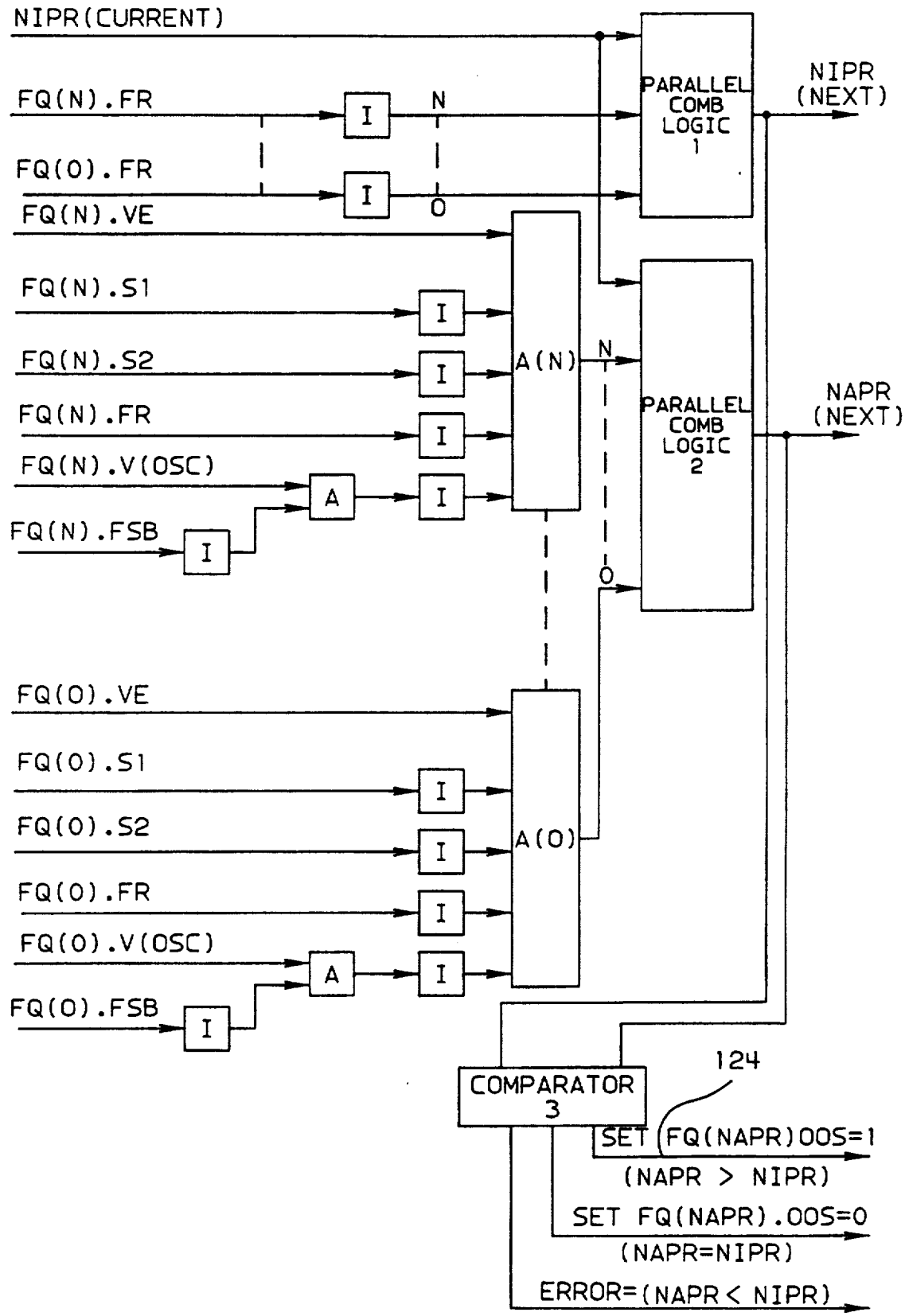
FIG. 23 is a logic diagram illustrating the NAPR and NIPR control means used with the OOSDT embodiment.

FIG. 23 shows the NIPR and NAPR logic circuits provided in the OOSDT embodiment for controlling FQE requests to the L1 cache. An OOSDT entry is made in OOSDT 160 for each new NAPR setting pointing to an FQE having its FR=0 while NAPR>NIPR or while any of the quasi-OOS fields are set to 1 in the FQE. Any invalid OOSDT entry (its Vi bit being set to 0) can be allocated for an OOS or quasi-OOS fetch request. Parallel combinatorial logic 1 therein receives the current NIPR value and the FR fields in all FQ entries to generate the next NIPR pointer value. Parallel combinatorial logic 2 receives the current NAPR value and the FR, VE, V(OSC), FSB, S1 and S2 fields in all FQ entries to generate the next NAPR pointer value. Comparator 3 compares the next NAPR and NIPR values to generate the NAPR>NIPR signal on line 124.

Also, a new OOSDT entry is made for each cache miss. A cache miss is signalled by the cache in the conventional manner except that the IDFO and EA are provided as tags with the miss signal to the OOSDT controls. The miss signal causes a new OOSDT entry to be allocated, and its M field is set to 1 during the cycle in which the miss is signalled. A new OOSDT entry is provided for a cache miss regardless of whether the same request had a prior entry due to its request being OOS. No prior OOSDT entry will exist if its fetch request is not OOS, which is indicated by a NAPR-=NIPR signal from comparator 3 in FIG. 23. Hence, no harm occurs if two OOSDT entries exist for any cache miss fetch.

As shown in FIG. 24, the IDFO field in the allocated OOSDT entry (OOSDT.IDFO) is written by either gate 148 or 149 for any one of several types of OOS or quasi-OOS fetch requests. The IDFO field in the OOSDT entry, provided by the FQ(NAPR).IDFO signal on line 131, is written by gate 148 when it is enabled by one of the following signals: 1. NAPR->NIPR fetch condition. 2. A quasi-OOS fetch signal on one of lines 121, 122 or 122, which is any of:

a. An FSB (fetch from a store buffer) signal, which is designated as an FQ(NAPR).FSB signal on line 121.
  b. A serializer fetch operand indicator S1, which is designated as FQ(NAPR).S1 on line 122.
  c. A post-serializer fetch indicator S2 for a fetch operand in an instruction following and overlapping an incomplete serializer instruction. It is designated as an FQ(NAPR).S2 signal on line 123.

An OOSDT entry is generated in the machine cycle in which the FQE is selected by NAPR for making a storage request for the represented operand data if any of the OOS or quasi-OOS conditions exist in the FQE. Then, the IDFO and EA in the FQE is gated into the IDFO and EA fields in the allocated OOSDT entry, and the Vi bit in the OOSDT entry is set to the 1 state.

In FIG. 23, a restriction is placed on the operation of the described OOSDT embodiment to prevent it from having to manage multiple OOS entries for the same fetch operand request, except for the cache miss condition. That is, except for cache misses, only one OOS condition is allowed per one fetch request in the OOSDT embodiment. An FQE may make a fetch request with any one of the following OOS or quasi-OOS conditions: a NAPR>NIPR condition, or a fetch from an SB condition, or an S1=1 condition, or an S2=1 condition.

The handling of multiple OOS conditions for a fetch operand would cause the operation of the OOSDT embodiment to become extremely complex and its hardware implementation may becomes very costly with little or no effect on the overall system performance, since multiple OOS conditions are rarely expected. (The prior two embodiments can handle any combination of the multiple-OOS conditions, because they operate significantly different from the OOSDT embodiment.)

For the OOSDT embodiment, a special NAPR operation enforces the "not more than one OOS condition per fetch request" limitation by providing an additional test within the previously described NAPR operation. The added test is done when NAPR points to an FQE which meets the fetch criteria previously defined for the NAPR operation. The added test determines if more than one OOS or quasi-OOS condition exists for the NAPR-pointed FQE. If none or one OOS condition exists for the NAPR-pointed FQE, a fetch request is issued to the L1 cache. If more than one OOS condition exists for the FQE, the NAPR-pointed FQE is skipped (by not making a fetch request for it). Eventually, the skipped FQE will have its OOS conditions dissipate. A skipped FQE may be again NAPR-pointed and skipped several times before it is eventually fetch requested after its OOS state reduces to not more than one OOS condition.

For example, suppose a fetch operand has its FQE.S2=1 (indicating a quasi-OOS condition due to following a serializer instruction not yet completed). If this FQE then has a NAPR>NIPR condition (a second OOS condition) when the FQE is being NAPR pointed, the added NAPR test then determines the fetch operand has two OOS conditions and is not then selectable by NAPR for a fetch request. NAPR then selects the next FQE meeting the OOSDT NAPR criteria.

In FIG. 23, the restriction for the NAPR>NIPR condition is controlled by the requirement that the NAPR-pointed FQE must have the following state immediately before it makes its cache request and before it is allowed to generate an OOSDT entry: VE=1, FR=0, FSB=0, V(OSC)=0, S1=0, and S2=0. This ensures that an OOSDT entry will be made for the NAPR>NIPR condition only if no quasi-OOS condition exists. That is, no FSB condition can exist while FSB=0, no OSC condition can exist while OSC=0, and no serializer condition can exist while S1=0 and S2=0. If a request having an OOSDT entry later obtains a cache miss, a second OOSDT entry is made for the request to indicate that it has become both an early fetch request (indicated by the NAPR>NIPR condition) and a late fetch request (indicated by a cache miss condition).

Each OOSDT entry has a removal dependency indicated in its DIDO field, which is compared to IDFO information returned to the OOSDT from the L1 cache controls. The DIDO field in an OOSDT entry is written into the OOSDT entry at the same time the IDFO field is written into that OOSDT entry. The content written into the DIDO field is controlled by the type of OOS or quasi- OOS condition indicated in the FQE for which the OOSDT entry is being make. The content of any valid OOSDT entry's DIDO field determines how that OOSDT entry will later be removed (by invalidation) from the OOSDT. The time of removal of the OOSDT entry occurs when the DIDO field's indicated information is returned from storage.

As shown in FIG. 24, the DIDO field (OOSDT-.DIDO) in the allocated OOSDT entry is written by one of gate 142, 143, 144 or 146 for one of several types of OOS or quasi-OOS fetch requests. The DIDO value written in the OOSDT entry and its gating signal is indicated as follows: 1. The true OOS fetch NAPR->NIPR condition on line 124 writes into the DIDO field: FQ(NUPR).IDFO.

2. A quasi-OOS fetch signal on one of lines 121, 122 or 122 operate as follows:
   a. An FSB (fetch from a store buffer) signal, FQ(NAPR).FSB, on line 121 gates into the DIDO field: FQ(NAPR).IDSO(OSC)
   b. A serializer fetch operand indicator FQ(NAPR).S1 on line 122 gates into the DIDO field: PSOP.IDSO
   c. A post-serializer fetch indicator FQ(NAPR).S2 on line 123 gates into the DIDO field: LSIDSO.IDSO The NUPR pointed FQE is used if the NAPR->NIPR OOS condition exists for a request to determine DIDO written in the allocated OOSDT entry, which is the IDFO field in the FQE currently pointed to by the NUPR shown in FIG. 5 using a signal designated as FQ(NUPR).IDFO provided on line 129.

For a NAPR>NIPR condition, the DIDO is selected by the operation of a NUPR (Next unfetched pointer register) which addresses an FQ entry that represents the DIDO. A DIDO determination by the NUPR is needed whenever the NAPR pointer becomes greater than the NIPR pointer, which indicates that at least one FQ entry not having made a fetch request exists between the NAPR and NUPR pointers. Then, the NUPR is initially set to the NAPR pointer, and the NUPR pointer is decremented to point to the next FQ entry going in the direction of the NIPR pointer. The fetch request (FR) bit is the FQ entry is tested, and as long as FR does not equal 0, the NUPR is again decremented. The test is repeated until the NUPR selects an FQ entry having FR=0.

Then the NUPR selected FQE has its IID and operand # read out as the DIDO for the OOSDT entry. And the current NAPR selected FQE has its IID and operand # read out as the corresponding IDFO for the same OOSDT entry. Also the NAPR entry has its EA read out and written in the currently selected OOSDT entry, and the V bit is set to 1 in the OOSDT entry to validate it.

The NUPR operations may be described with the following expressions when no quasi-OOS condition exists:
   If NAPR=NIPR=NUPR, there is no OOS FQ entry (and no OOSDT entry is allocated), and the NUPR can not select any DIDO;
   Whenever NAPR not=NIPR, set NUPR to NAPR, and
   NAPR selects the FQ entry having the IDFO for an allocated OOSDT entry, but NUPR does not select any DIDO while NUPR =NAPR; Decrement NUPR by −1 to point to each next FQE with a smaller IID, and if the FQE has FR=1, decrement again;
   Stop decrementing NUPR when the FQE has FR=0.

The NUPR pointer selects the FQE having the DIDO in for the OOSDT entry, while NAPR is pointing to the FQE having its IDFO.

For fetches from a SB, the DIDO is the OSC control field of the NAPR selected FQ entry, i.e. FQ(NAPR).IDSO(OSC), identifies the last store request to the SB prior to this FQ entry. Then the FSB bit is set on in the SQ entry identified by the IDSO(OSC). The SB# (store buffer number) field in the FQ entry is set to the assigned location in the SB at the time the FQ entry is generated for its store request. SB fetches are considered early fetches because they return data before the time that a cache hit for the same FQ request could return data (which is the standard data return time).

When an OOSDT entry is generated for a cache miss, both the IDFO and the DIDO fields in the allocated OOSDT entry are instead set to the RETURN.IDFO sent back by the L1 cache with the miss signal. A cache miss signal provided from line 138 enables gates 149, 152 and 153. They gate into the IDFO, EA and M fields in the allocated OOSDT entry, respectively, the RETURN.IDFO signal on line 132, the RETURN.EA signal on line 133, and the 1 state from line 137.

OOSDT SERIALIZATION CONTROL

The OOSDT embodiment also supports the overlapped fetching of operands affected by a serializer instruction in the instruction stream. The OOSDT embodiment eliminates or reduces the conventional serialization overhead that slows the execution of an instruction stream when a serialization instruction is encountered and avoids stopping the instruction decode process for a serializer, as occurs in conventional systems.

Fetch operands affected by serialization instructions are tagged by adding serialization control bit fields S1 and S2 to each entry in the FQ. Bit S1 is set on (to 1) in the FQE of each fetch operand of a serializer instruction. Bit S2 is set on (to 1) in the FQEs for the fetch operands of instructions following a serializer during the period before the serializer instruction has completed its execution. All fetch operands tagged with a S1 or S2 bit set to 1 are handled by this invention as quasi-OOS fetch operands. They do not use the relationship between the NAPR and the NIPR, which is why they may be considered quasi-OOS fetches.

When issuing an L1 cache request for an FQE having either its S1 or S2 bit in the on state, an FQ(NAPR).EA signal is sent on line 73 from FIG. 17 to the OOSDT embodiment in FIG. 24. The signal causes the OOSDT embodiment to allocate an OOSDT entry for the quasi-OOS fetch request.

The OOS handling of serializing instructions (serializers) is supported by a PSOP (prior store operand pointer) register and an LSIDSO register, both of which are shown in FIG. 6.

The PSOP register receives the IDSO in each newly generated SQ entry. Each received IDSO overlays the IDSO in the PSOP register. Therefore, the PSOP register maintains the IDSO of the last decoded store operand. However, the PSOP content is frozen when a serializer is decoded.

The LSIDSO register receives the IDSO of each store operand in each decoded serializer instruction, each overlaying the next. Therefore, the LSIDSO register stores the IDSO of the last decoded store operand of any currently decoded serialization instruction.

Accordingly, when any serializer is being decoded, the PSOP register contains the IDSO of the last store operand immediately prior to the serializer instruction. As decoding proceeds, the S1 bit is set on in the FQE allocated for each fetch to be requested for the serializer, not including an FQE for any store operand in the serializer. An OOSDT entry is made for each FQE request having its S1=1, in which the DIDO field is set to the current IDSO content in the PSOP register: (PSOP.IDSO).

Before the serializer instruction completes its execution, subsequent instructions may have their operand specifications decoded, and the S2 bit is then set on in each FQE allocated for each later fetch operand overlapping the execution of the serializer.

The last decoded operand specification of a serializer may be for a store operand. Not all serializing instructions have store operands. If the serializer has a store operand, the IDSO in the SQE representing the last store operand is set into the LSIDSO register. The DIDO field is set to the current IDSO content in the LSIDSO register (LSIDSO.IDSO) in an OOSDT entry made for an FQE request having its S2=1.

DATA RETURN

DIDO dependency determinations for OOSDT entries are made when data is returned from the cache for satisfying a fetch request. The data return operations determine if any OOSDT entries are to be removed (invalidated) in the OOSDT to end the OOS windows of exposure to XI requests, or if the removal dependency of one or more OOSDT entries is to be changed to await the return of data for a different operand.

The cache circuits remember the EA and IDFO or IDSO provided with each cache request, and they are tagged to the requested data wherever the data is accessed in the storage hierarchy. When the storage hierarchy completes its access of the requested data (fetch or store), the cache communicates the access completion by simultaneously sending back the EA and IDFO with the fetched data, or with a cache miss signal, or the EA and IDSO with a completion signal for a store. The RETURN.IDFO and RETURN.EA are received on lines 132 and 134 in FIG. 24.

Figure 25:
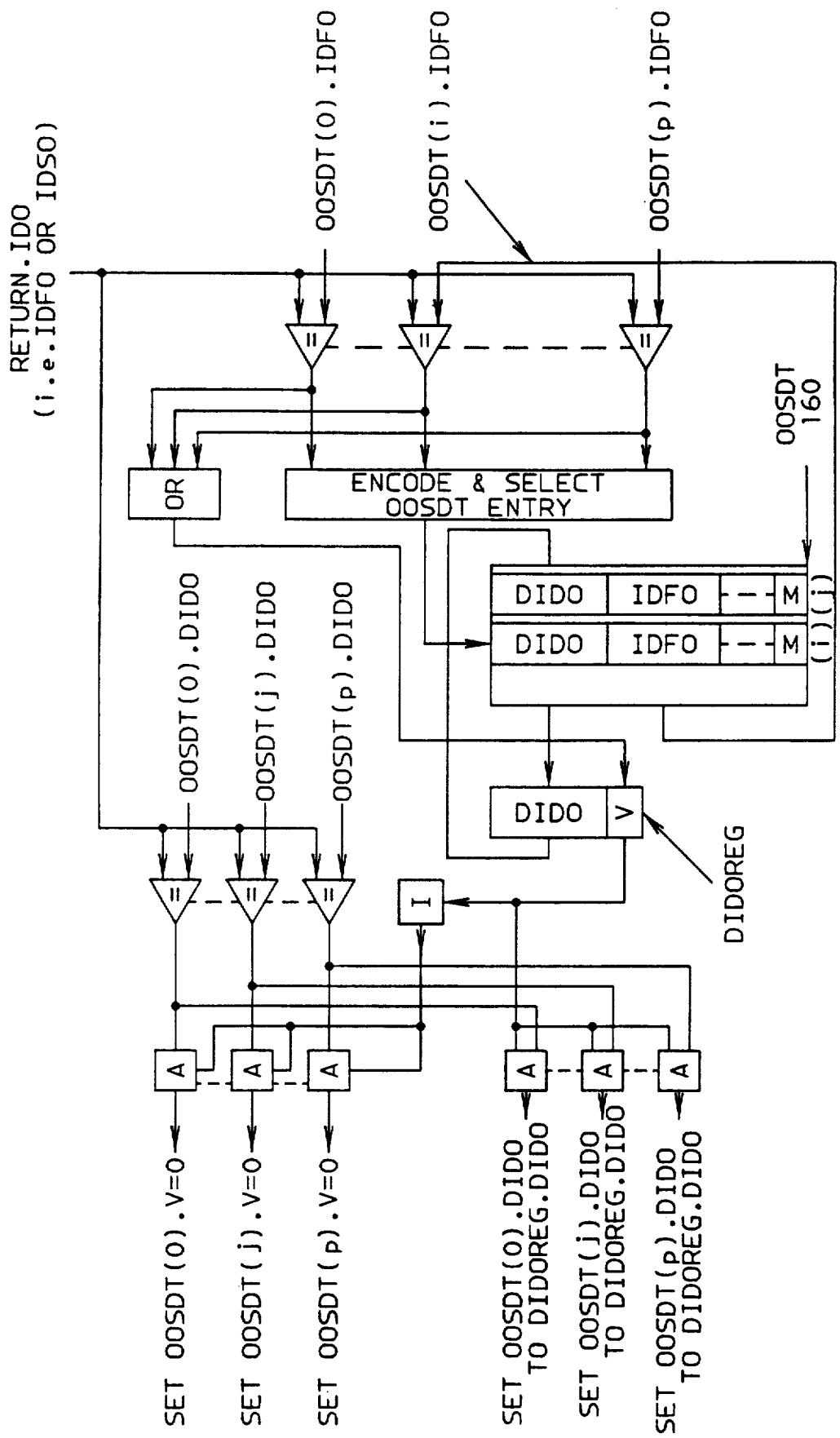
FIG. 25 shows detailed structure for the parallel logic for data return used in the OOSDT embodiment.

FIG. 25 shows in more detail the parallel logic circuits 172 found in FIG. 24. Circuits 172 compare each RETURN.IDFO in parallel with all IDFO fields and all DIDO fields in all valid OOSDT entries. If M=0 and an OOSDT entry i is found to have its OOSDT(i).IDFO field equal to the RETURN.IDFO, its OOSDT(i).DIDO field is read into a register called DIDOREG, and a V bit field in the DIDOREG is set on (to 1 state). (The IDFO and DIDO fields in entry i may be represented as either OOSDT(i).IDFO and OOSDT(i).DIDO or as IDFO(i) and DIDO(i).)

But if any DIDO field is found in any one or more entries j in the OOSDT to be equal to the RETURN.IDFO, the DIDOREG.DIDO is copied into each OOSDT(j).DIDO field in the table. This process changes the dependency for the OOSDT entries j, so that their removal is thereafter controlled by the return of the data for the operand identified by DIDO(i).

But if no OOSDT(i) entry is found, then for each DIDO(j) field equal to the RETURN.IDFO, each found OOSDT entry j is invalidated by setting its V=0.

When a cache miss is indicated by M=1 in any entry found to have its OOSDT(i).IDFO field equal to the RETURN.IDFO, the OOSDT entry i is invalidated by setting its V=0, because that request is no longer OOS after its data is received. (IDFO and DIDO are equal in an OOSDT entry having M=1.)

The completion of a store has a dependency effect on the OOSDT entries when a DIDO(j) is equal to the RETURN.IDO (which is an IDSO). Stores are presumed not to be OOS, since they are accessed in their conceptual order.

OOSDT XI OPERATION

Each XI request provides an EA (called XI.EA), and this EA is compared in parallel with the EAs in all OOSDT entries. If any OOSDT entry compares equal (XI hit), an instruction retry signal is generated which initiates a retry operation.

PRECISE OPERATION DESCRIPTION

The operation of the OOSDT embodiment can be more precisely described by the following mathematical statements:

| 1. MAKING ENTRIES IN OOSDT: | |
|---|---|
| 1. SET NAPR TO POINT TO NEXT FETCH REQUEST (FQE) | |
| A. IF NAPR > NIPR, THEN | NUPR setting determination. Makes OOSDT entry for FQE fetching OOS. |
| 1) SET NUPR TO POINT TO DIDO FQE | |
| 2) ASSIGN OOSDT ENTRY, & SET: | |
| a) OOSDT.EA = FQ(NAPR).EA | |
| b) OOSDT.IDFO = FQ(NAPR).IDFO | |
| c) OOSDT.DIDO = FQ(NUPR).IDFO | |
| d) OOSDT.V = 1 | |
| B. IF FQ(NAPR).FSB = 1, THEN | Make OOSDT entry for fetching from SB. (Removal of FSB type OOSDT entry depends on completion of instruction causing OSC for this OOSDT entry.) |
| 1) ASSIGN OOSDT ENTRY, & SET: | |
| a) OOSDT.EA = FQ(NAPR).EA | |
| b) OOSDT.IDFO = FQ(NAPR).IDFO | |
| c) OOSDT.DIDO = FQ(NAPR).IDSO(OSC) | |
| d) OOSDT.V = 1 | |
| C. IF FQ(NAPR).S1 = 1, THEN | Makes OOSDT entry for FQE fetching during execution of a serializer. (Removal of S1 type OOSDT entry depends on completion of store instruction prior to serializer.) |
| 1) ASSIGN OOSDT ENTRY, & SET: | |
| a) OOSDT.EA = FQ(NAPR).EA | |
| b) OOSDT.IDFO = FQ(NAPR).IDFO | |
| c) OOSDT.DIDO = SQ(PSOP).IDSO | |
| d) SET OOSDT.V = 1 | |
| D. IF FQ(NAPR).S2 = 1, THEN | Makes OOSDT |

-continued

| | |
|---|---|
| 1) ASSIGN OOSDT ENTRY, & SET:<br>a) OOSDT.EA = FQ(NAPR).EA<br>b) OOSDT.IDFO = FQ(NAPR).IDFO<br>c) OOSDT.DIDO = LSIDSO<br>d) OOSDT.V = 1 | entry for serializer FQE fetching before last store prior to the serializer in LSIDSO. (Removal of S2 type OOSDT entry depends on completion of last store of serializer.) |
| 2. SEND FQ(NAPR) FETCH REQUEST TO CACHE<br>3. CACHE CONTROLS REMEMBER IDFO & EA OF REQUEST, & IF FQ(NAPR) FETCH REQUEST MISSES IN THE CACHE, IT SENDS TO OOSDT:<br>RETURN.EA & RETURN.IDFO<br>THEN<br>1) OOSDT ASSIGNS ENTRY, & SETS:<br>a) OOSDT.EA = RETURN.EA<br>b) OOSDT.IDFO = RETURN.IDFO<br>c) OOSDT.DIDO = RETURN.IDFO<br>d) OOSDT.V = 1<br>e) OOSDT.M = 1 | Makes OOSDT entry with miss signal, for cache miss. (Removal of cache miss OOSDT entry depends on return of cache miss data.) |

II. OOSDT FQ CONTROL for SERIALIZER INSTRUCTIONS:
(Assumes only one serializer instruction in process at a time)

| | |
|---|---|
| 1. NORMAL INSTRUCTION DECODING, AND UPON ENCOUNTERING EACH NON-SERIALIZER INSTRUCTION HAVING A STORE OPERAND:<br>A. DECODE THE STORE INSTRUCTION<br>B. ASSIGN A STORE QUEUE ENTRY (SQE)<br>C. SET IDSO IN SQE INTO PSOP (Prior Store Operand register)<br>D. CONTINUE INSTRUCTION DECODING PROCESS<br>1. until a serializing instruction is encountered | Determines "prior store" in pre--serializer operations. (PSOP will have last last store prior to encountering each serializer instruction.) |
| 2. SERIALIZER INSTRUCTION ENCOUNTERED & DECODED:<br>A. PROVIDE FQE FOR EACH SERIALIZER FETCH OPERAND<br>SET FQE.S1 = 1<br>SET FQE.S2 = 0<br>B. SET CONTROLS TO HOLD the CONTENTS OF PSOP UNCHANGED<br>C. PROVIDE SQE FOR EACH SERIALIZER STORE OPERAND<br>D. SET IDSO OF LAST SERIALIZER STORE OPERAND<br>INTO LSIDSO (Last Serializer IDSO REG) | (Serializer operations.) |
| 3. CONTINUE DECODING INSTRUCTIONS AFTER SERIALIZER<br>A. PROVIDE FQE FOR EACH FETCH OPERAND<br>SET FQE.S1 = 0<br>SET FQE.S2 = 1<br>B. PROVIDE SQE FOR EACH STORE OPERAND | (Post-serializer operations.) |
| 4. COMPLETE PRIOR STORE OPERATION INDICATED IN PSOP | (Prior store may complete at any time after its decode.) |
| 5. SET FQE(ALL).S1 = 0<br>6. COMPLETE SERIALIZER STORE OPERATION | (Serializer store may complete at any time after decode of serializer, and after "prior store" are both complete.) |
| 7. A. SET FQE(ALL).S2 = 0<br>B. SET CONTROLS TO ALLOW PSOP TO CHANGE | |

-continued

```
8. GOTO 1. ABOVE TO CONTINUE EXECUTING FOLLOWING
INSTRUCTIONS
        III. REMOVAL OF OOSDT ENTRIES:
              A. SET DIDOREG.V=0 B. DO i = O TO P (preferably in
              parallel on all OOSDT entries)
              1) IF(OOSDT(i).IDFO=RETURN.IDFO & V(i)=1 & M(i)=0),THEN
              a) SET DIDOREG.DIDO=OOSDT(i).DIDO
              b) SET DIDOREG.V=1
              (Searches for any OOSDT(i)=RETURN.IDFO & if
              OOSDT(i) is found, sets DIDO(i) into DIDO field
              in a register called DIDOREG and set it valid
              bit V=1.)
              2) IF(OOSDT(i).IDFO=RETURN.IDFO & V(i)=1 & M(i)=1),THEN
              a) SET OOSDT(i).V=0
              (If OOSDT(i) is found & if M=1 for a cache miss,
              remove OOSDT(i).)
              ENDDO
              C. IF (DIDOREG.V=0), THEN
              1) IF(ANY OOSDT(j).DIDO=RETURN.IDFO),THEN
              a) SET ANY OOSDT(j).V=0
              (If no OOSDT(i) is found, search for any
              OOSDT(j) having DIDO(j)=RETURN IDFO, and if
              found, remove each OOSDT(j).)
              D. ELSE
              1) IF(ANY OOSDT(j).DIDO=RETURN.IDFO),THEN
              a) SET OOSDT(j).DIDO = DIDOREG.DIDO
              (And if OOSDT(i) is found, set each DIDO(j) to
              DIDO(i).)
        VI. STORE COMPLETION REGARDING OOSDT:
              (Store operands have no OOSDT entries, because
              store operands are accessed in conceptual
              sequence & hence are not OOS.)
              IF (OOSDT(ANY).DIDO=STORE COMPLETE.IDSO)
              THEN SET OOSDT(ANY).V=0
              (Store completion indicates instruction
              completion, which causes removal of any OOSDT
              entry for fetch for this instruction.)
        V. XI HANDLING BY OOSDT:
              IF OOSDT(ANY).EA = XI.EA
              THEN
              SIGNAL THE COMPLETION QUEUE (CQ) TO RESET ALL
              INSTRUCTION EXECUTION IN PROCESS AND BEGIN EXECUTION
              FROM OLDEST INCOMPLETE INSTRUCTION
```

While the invention has been described with reference to the preferred embodiments thereof, various modifications and changes may be made to those skilled in the art without departing from the true spirit and scope of the invention as defined by the claims hereof.

Having thus described our invention, what we claim as new and desire to secure by Letters Patent is:

1. A processor having data and instruction storage, the processor being one of a plurality of processors in a multiprocessor system (MP), the processor comprising:
   instruction decoding means, having instruction buffers for storing fetched instructions assigning instructions indentifier (IID) in sequence at least to each decoded stored instruction in the order that instructions are provided by a program executing on the processor, a conceptual sequence for the instructions in each of said plurality of processors being indicated by the sequence of the assigned IIDs in the processor, and the operand of the instruction being assigned the IID of the instruction;
   storage means for storing data units most recently used by the processor, said storage means including a private (L1) cache having an L1 directory with an entry for each data unit in the L1 cache;
   cross-invalidate (XI) means for invalidating an L1 entry with a storage address equal to a storage address provided with an XI request from another processor;
   means for testing for an out-of-sequence (OOS) indication in an OOS condition field associated with an L1 entry accessed for an XI request of another processor;
   means for requesting a fetch of data from the storage means for a fetch operand specification of an instruction being decoded by the decoding means without regard to the conceptual sequence of the IIDs assigned to the fetch operands;
   means for storing data for storing a store operand specification decoded by the decoding means with regard to the conceptual sequence of the IIDs assigned to the store operands;
   means for detecting an out-of-sequence (OOS) condition for a fetch operand of any instruction decoded or completed having an assigned IID of an instruction in violation of the conceptual sequence of the assigned IIDs;
   instruction execution means receiving all fetch operands and store operands and completing the execution of each instruction in conceptual sequence without regard for the sequence of fetches returned from said storage means as long as no OOS condition is detected by the OOS detecting means; and
   means for initiating the executing means to reexecute the program in the sequence of the program from, or before, any instruction having a fetch operand for which the detecting means detected an OOS condition.

2. A processor having data and instruction storage, as defined in claim 1, the OOS detecting means comprising:

means for comparing the IID of a current fetch request with the IID Of the oldest unfetched request to determine if the IIDs of the fetch requests are in the sequence of assigned IIDs to indicate the operands are in the conceptual sequence; and means for signalling an OOS condition for either one or both of the compared fetch requests if the comparing means indicates their IIDs are not in the assigned sequence.

3. A processor having data and instruction storage, as defined in claim 2, comprising:

request holding means having a plurality of fetch request representations for operands in the process of preparing to fetch data from storage, the request holding means holding each fetch request representation for at least until the requested data is obtained; and means for storing information into the fetch request representation, including a storage address for data to be fetched and including any OOS condition signal from the signalling means for the fetch request.

4. A processor having data and instruction storage, as defined in claim 1, the processor being one of a plurality of processors in a multiprocessor system (MP), the OOS field associated with each L1 directory entry comprising:

means for setting on an OOS field associated with an L1 entry accessed by a fetch request having an OOS condition signal field in its fetch request representation; and an OOS bit set on in response to being accessed by a fetch request having a representation with an OOS condition signal.

5. A processor having data and instruction storage, as defined in claim 4, the processor being one of a plurality of processors in a multiprocessor system (MP), the processor comprising:

OOS bit turn-on means for setting on the OOS bit in the L1 directory associated with all fetches requested during the period that a fetch request with a cache miss has unreturned data.

6. A processor having data and instruction storage, as defined in claim 4, the processor being one of a plurality of processors in a multiprocessor system (MP), the processor comprising:

OOS bit turn-on means for setting on the OOS bit associated with all fetches requested by the decoding means when it decodes of a serializing instruction of all prior storage requests) until the serializing instruction has its execution completed.

7. A processor having data and instruction storage, as defined in claim 4, the processor being one of a plurality of processors in a multiprocessor system (MP), the processor comprising:

store buffers in an instruction/execution part of the CPU for receiving data from storage fetched for a store operand; and OOS bit turn-on means for setting on the OOS bit associated with an L1 directory entry accessed by a fetch request that accesses data for a store operand in a store buffer.

8. A processor having data and instruction storage, as defined in claim 4, the processor being one of a plurality of processors in a multiprocessor system (MP), the processor comprising:

OOS bit turn-off means for resetting off all OOS bits associated with an L1 directory while no fetch request is accessing data for a store operand from any store buffer, and no fetch request has a cache miss with unreturned data, and no fetch request is being processed for a fetch operand of a serialization type of instruction, and no fetch request representations in the request holding means has any indication of an OOS condition; and an OOS mode state means for setting the CPU to its OOS mode state in response to an output from the OOS bit turn-off means to enable the setting on of OOS bits associated with the L1 directory entries.

9. A processor having data and instruction storage, as defined in claim 8, the processor being one of a plurality of processors in a multiprocessor system (MP), the OOS mode state means further comprising:

counter means for counting the number of OOS bits that have been turned on; and

OOS disabling means being actuated when the counter means reaches a predetermined count to reset the OOS mode state means from enable state to its OOS mode disabled state.

10. A processor having data and instruction storage, as defined in claim 1, the processor being one of a plurality of processors in a multiprocessor system (MP), the OOS field associated with each L1 directory entry comprising:

an OOS IID (instruction identifier) field associated with each L1 directory entry; and means for setting the OOS IID field to the IID of a fetch request accessing the associated L1 directory entry with an OOS condition signal.

11. A processor having data and instruction storage, as defined in claim 10, the processor being one of a plurality of processors in a multiprocessor system (MP), the processor comprising:

OOS IID tag storage means for receiving and temporarily storing the IID of each fetch request having an OOS indication in a tag entry at a location corresponding to an L1 directory entry accessed by the fetch request; and means for indicating the validity of each tag entry.

12. A processor having data and instruction storage, as defined in claim 11, the processor being one of a plurality of processors in a multiprocessor system (MP), the processor comprising:

means for detecting the validity of a tag entry corresponding to an L1 directory entry accessed by the XI means;

means for reading the OOS IID in the tag entry if the detecting means indicates the tag entry is valid; and means for reinitiating execution of a current program from, or before, an instruction having the OOS IID read by the reading means.

13. A processor having data and instruction storage, as defined in claim 12, the processor being one of a plurality of processors in a multiprocessor system (MP), the processor comprising:

means for resetting to an invalid state the tag entry having the OOS IID read by the reading means, comprising:

means for providing the IID of each instruction being completed; and means for comparing the OOS IID in the read tag entry with the IID of each completed instruction and setting the tag entry to an invalid state upon an equal comparison.

14. A processor having data and instruction storage, as defined in claim 12, the processor being one of a plurality of processors in a multiprocessor system (MP), the processor comprising:

OOS IID stack storage means for receiving and temporarily storing the EA (effective address) into a stack entry at a stack location corresponding to the received OOS IID for data to be fetched by each fetch request having an OOS indication; and means for indicating the validity of each stack entry.

15. A processor having data and instruction storage, as defined in claim 14, the processor being one of a plurality of processors in a multiprocessor system (MP), tag entry invalidating means comprising:

means for providing the IID of each instruction being completed in response to the initiating means;

means for finding any valid stack entry in the stack storage means having the IID of each completed instruction;

means for reading out an EA in any found stack entry;

means for locating an OOS IID in a tag entry in the tag storage means with the read out EA; and setting the located tag entry to an invalid state.

16. A processor having data and instruction storage, as defined in claim 12, the processor being one of a plurality of processors in a multiprocessor system (MP), entry invalidating means comprising:

means for invalidating all tag entries.

17. A processor having data and instruction storage, as defined in claim 14, the processor being one of a plurality of processors in a multiprocessor system (MP), entry invalidating means comprising:

means for invalidating all tag entries and all stack entries.

18. A processor having data and instruction storage, as defined in claim 1, comprising:

means in the fetch requesting means for setting a serializer field to indicate a serializing instruction is being decoded;

the detecting means detecting for the occurrence of an OOS condition of a fetch operand when the serializer field is set to a serializer state in the fetch operand request representation and providing the IID assigned to the operand; and means for initiating reexecution of a current program including an instruction having an OOS IID provided by the detecting means.

19. A processor having data and instruction storage, as defined in claim 1, processor means for supporting OOS fetch operands further comprising:

means for signalling a retry being actuated by the XI hit signal; and means for initiating a restart of the program at the oldest instruction currently having its execution incomplete in response a retry signal.

20. A multiprocessor system (MP) with a plurality of processors, and MP storage used in common by the processors for the storage of data and instruction, each processor comprising:

cache means for storing data units most recently used by the processor;

instruction decoding means for assigning an instruction identifier (IID) in sequence at least to each decoded storage instruction in the order that instructions are provided by a program executing on the processor, a conceptual sequence for the instructions in the executing program in each processor being indicated by the sequence of the assigned IIDs in the processor, the operands of an instruction being assigned the IID of the instruction;

means for requesting the cache means for a return of fetch data for a fetch operand specification of an instruction being decoded by the decoding means without regard to the conceptual sequence of the IIDs assigned to the fetch operands;

means for accessing data for a store operand specification decoded by the decoding means with regard to the conceptual sequence of the IIDs assigned to the store operands;

means for detecting an out-of-sequence (OOS) condition for a fetch operand having an assigned IID of an instruction out of the conceptual sequence of the IIDs;

means for determining an OOS window as the period of time that the fetch operand is detected as OOS by the detecting means;

means for storing the OOS indications for fetch operands associatively with affected entries in the processor's cache at least during the OOS window in a location accessible for all processors in the MP;

means for generating a cross-invalidation (XI) request sent to each other processor in the MP when the processor requests to store in its cache in order to invalidate from the cache in each other processor any copy of the data unit to be stored into;

means for detecting a problem OOS condition as the occurrence of an XI request from another processor during an OOS window; and means for re-executing instructions in the processor provided by a program at least from any instruction having a fetch operand with a detected OOS condition if a problem OOS condition is detected.

21. A processor having data and instruction storage, as defined in claim 20, the requesting means comprising:

a plurality of fetch queue (FQ) entries in a FQ, each FQ entry containing fields for controlling a fetch request, the fields including a fetch request (FR) field set when requested data returns from storage;

NIPR (Next In-sequence-fetch Pointer Register) means for addressing a current FQ entry having its FR field set off and being the next in sequence FQ entry in the FQ to issue a fetch request to storage; and means for changing the setting of the NIPR means when the currently address FQ (Fetch Queue) entry has its FR (Fetch Requested) field set on to change the NIPR setting to address the currently oldest valid FQ entry having its FQ field set off to a non-requested state to control a conceptual sequence of FQ entries addressed by the NIPR means.

22. A processor having data and instruction storage, as defined in claim 21, the requesting means comprising:

a plurality of fetch queue (FQ) entries in a FQ, each FQ entry containing fields for controlling a fetch request, including:

an effective address (EA) validly addressing requested data in storage;

a fetch request (FR) field set on when data is requested from storage;

an OSC indicator set on to indicate when the FQ entry has an operand storage compare condition due to the EA in the FQ entry addressing the same storage location as a store request of an earlier instruction which has not had a store acknowledge signal indicating the store operation has been completed; and NAPR (Next Actual Pointer Register) means detecting each FQ entry having a valid address in its EA field and its OSC (Operand Store Compare) field indicating no OSC condition exists for the EA and its FR field indicating no request has yet been made for the FQ entry, and the NAPR means operating for each NAPR detected FQ entry by issuing a fetch request to storage for accessing the requested data at the EA in the respective FQ entry, including setting the FR field to indicate a requested state to control the sequence of fetch requests from the FQ to storage which need not be in conceptual sequence.

23. A processor having data and instruction storage, as defined in claim 22, the requesting means comprising:
a plurality of fetch queue (FQ) entries in a FQ, each FQ entry containing fields for controlling a fetch request, including:
an effective address (EA) validly addressing requested data in storage;
a fetch request (FR) field set on when data is requested from storage;
a data return field set on when requested data returns from storage;
an OSC indicator set on to indicate when the FQ entry has an operand storage compare condition due to the EA in the FQ entry addressing the same storage location as a store request of an earlier instruction which has not had a store acknowledge signal indicating the store operation has been completed; and
DQPR (Dequeuing Pointer Register) means detecting each FQ entry having its DR (Data Return) field set on indicating requested data has returned from storage for the execution of a respective instruction and resetting the FQ entry to an invalid state.

24. A processor having data and instruction storage, as defined in claim 22, the requesting means comprising:
NUPR (Next Unfetched Pointer Register) means for detecting and addressing each dependent FQ entry (DIDO), the dependent FQ entry being a FQ entry following a NAPR addressed FQ entry (IDRO) and the DIDO (Dependency Identified Operand) having a discontinuity in its IID in relation to the IID sequence of the entries provided to the FQ, the DIDO and the IDFO from which the DIDO determines its IID discontinuity being a IDFO/DIDO pair.

25. A processor having data and instruction storage, as defined in claim 24, NUPR means further comprising:
means for setting the NUPR to the pointer contained in the NAPR when the NAPR pointer is different from the NIPR pointer;
means for incrementing pointer values in the NUPR in the direction of a pointer value in the NIPR until a fetch queue entry (FQE) is found that represents a fetch operand has not been requested from storage; and
means for writing the pointer value in the NUPR into a dependent field (DIDO) in a table for comparing storage addresses of out-of-sequence fetch requests with addresses of cross-invalidate requests of another processor in an MP.

26. A particular processor having data and instruction storage, the processor being one of plural CPUs in a multiprocessor system (MP), the processor containing an instruction/execution unit including decoding means for decoding instructions in conceptual sequence including detecting fetch operand specifications and store operand specifications in the respective instructions of a program being executed by the processor, and a storage hierarchy containing a cache exclusively used by the processor for accessing operand data from storage as required by instructions of the program, the cache receiving cross-invalidate (XI) requests of other processors in the MP for releasing control of data units to an XI requesting other processor in the MP, the particular processor further comprising:
means for generating and requesting a fetch operand as soon as a fetch request to the cache is generated from the fetch operand specification in an instruction currently decoded by the decoding means in the processor;
means for determining if the fetch request is in the conceptual sequence of decoded operand specifications from the decoding means;
out-of-sequence (OOS) table means having an OOS table (OOST) entry generated therein for each fetch request determined by the determining means to be out of the conceptual sequence of operands;
each OOST entry receiving an identifier (IDFO) of the OOS fetch operand and a storage location (EA) for a data unit for the operand; and
means for providing a dependency identifier (DIDO) in the OOST entry for determining a condition for removal of the OOST entry from the OOST.

27. A particular processor in an MP, as defined in claim 26, the processor further comprising:
means for determining one or more quasi-OOS conditions (following a serializing instruction) for a fetch operand that can exist independent of any actual OOS condition for the operand;
means for generating an OOST entry for a fetch request having a quasi-OOS condition, the OOST entry for a quasi-OOS operand also receiving an IDFO and an EA (effective address) for a data unit for the operand; and
means for providing a dependency indentifier (DIDO) in the OOST entry for the quasi-OOS operand indicating a condition for removal of the quasi-OOS OOST entry from the OOST.

28. A particular processor in an MP, as defined in claim 27, the fetch request generating and requesting means further comprising:
means for providing the IDFO and EA of each OOS fetch request to the cache for enabling the storage hierarchy to tag the data unit fetched for the request with the IDFO and EA; and
data return controls with the cache for sending the IDFO and EA tagged with the fetched data unit to the instruction/execution unit of the processor.

29. A particular processor in an MP, as defined in claim 28, the processor further comprising:
an associative array containing the OOST for receiving each OOST entry for each OOS fetch request to the cache; and
OOST search means for searching in parallel in all valid entries in the associative array for an IDFO identifier equal to a tagged IDFO returned to the instruction/execution unit by the data return controls with the cache for a data unit for a fetch request.

30. A particular processor in an MP, as defined in claim 28, the means for providing a dependency identifier (DIDO) for an OOS or quasi-OOS fetch operand further comprising:
a fetch operand queue for receiving an entry (FQE) for each fetch specification provided by the decoder means;
request selection means (NAPR) for selecting each FQE to next have a fetch request to the cache;
conceptual order indicating means (NIPR) for indicating the next fetch request issued in the conceptual order of the fetch requests in the queue;
dependency FQE indicating means (NUPR) for indicating the oldest entry in the queue in a condition for making a fetch request to the cache for an operand data unit; and
writing an identifier (IDFO) of the operand represented by the FQE indicated by the dependency FQE indicating means (NUPR) into the OOST entry.

31. A particular processor in an MP, as defined in claim 28, the means for providing a dependency identifier (DIDO) for an OOS or quasi-OOS fetch operand further comprising:
cache miss signalling means with the cache for signalling to the OOST the IDFO and EA of a fetch request being delayed by a cache miss;
means for making an entry in the OOST for the fetch operand of each cache miss signalled by the cache miss signalling means; and
means for setting both an IDFO and a DIDO in the OOST entry provided by the making means to the value of the IDFO returned with the cache miss signal, and also setting a cache miss indicator for the OOST entry.

32. A particular processor in an MP, as defined in claim 28, the means for providing a dependency identifier (DIDO) for an OOS or quasi-OOS fetch operand further comprising:
the fetch operand requesting means indicating when a fetch request is for a store operand;
store buffer (SB) means for receiving data units fetched in response to a store operand request;
means for generating a fetch request for fetching a data unit from a SB, the SB fetching being a quasi-OOS condition for a fetch request;
means for generating an OOST entry for a quasi-OOS fetch request that is to fetch a data unit from a SB; and
means for providing a dependency identifier (DIDO) in the OOST entry that identifies the store operand for which the SB fetch is being made, the removal of the OOST entry from the OOST occurring when the storage access for the store operand is complete.

33. A particular processor in an MP, as defined in claim 28, the means for providing dependency identifiers (DIDOs) for OOS and quasi-OOS fetch operands further comprising:
means for indicating when a fetch operand is for a serialization instruction (requiring completion of all prior storage requests);
means for indicating a quasi-OOS condition for a fetch request for fetching a data unit from the storage hierarchy for each operand in the serialization instruction;
means for generating an OOST entry for each quasi-OOS fetch request made for the serialization instruction;
means for providing a dependency identifier (DIDO) in each OOST entry made for each quasi-OOS fetch request for the serialization instruction, the dependency identifier identifying the last store operand decoded prior to the serialization instruction, the removal of the OOST entry from the OOST occurring when the storage access for the last store operand is complete;
means for signalling when execution of the serialization instruction is complete;
means for indicating a quasi-OOS condition for each fetch request provided by any instruction following the serialization instruction before the signalling means signals that the execution is complete for the serialization instruction;
means for generating an OOST entry for each quasi-OOS fetch request made following the serialization instruction; and
means for providing a dependency identifier (DIDO) in each OOST entry made for each quasi-OOS fetch operand following the serialization instruction, the dependency identifier identifying any store operand in the serialization instruction, the removal of the OOST entry from the OOST occurring when the storage access for the serialization instructions's store operand is complete.

34. A particular processor in an MP, as defined in claim 33, the means for providing dependency identifiers (DIDOs) for OOS and quasi-OOS fetch operands further comprising:
means for providing first and second indicator fields in any selected entry (FQE) in a fetch queue used for storage fetch requests not currently having returned data, the first indicator field being set to indicate a fetch request for a fetch operand in a serialization instruction, the second indicator field being set to indicate a fetch request for a fetch operand in an instruction following a serialization instruction.

35. A particular processor in an MP, as defined in claim 33, processor means for supporting OOS and quasi-OOS fetch operands further comprising:
means for comparing the returned IDFO provided by the data return controls with the IDFO in each OOST entry;
means for registering the DIDO(i) in any entry OOST(i) found to have an IDFO(i) equal to the returned IDFO and not OOST(i) not having a cache miss, and means for removing any found entry OOST(i) having a cache miss;
means for comparing the returned IDFO with the DIDO in each OOST entry to find any OOST(j) having a DIDO(j) equal to the returned IDFO;
means for removing any found entry OOST(j) if no OOST(i) is found; and
means for setting each DIDO(j) to the registered DIDO(i) if OOST(i) is found.

36. A particular processor in an MP, as defined in claim 34, processor means for supporting OOS and quasi-OOS fetch operands further comprising:
associative array means containing the OOST for enabling the returned IDFO to be compared in parallel with the IDFOs and the DIDOs in all OOST entries.

37. A particular processor in an MP, as defined in claim 35, processor means for supporting OOS and quasi-OOS fetch operands further comprising:

means for invalidating any OOST entry having a DIDO that compares equal with any returned identifier for a store operand.

38. A particular processor in an MP, as defined in claim 36, processor means for supporting OOS and quasi-OOS fetch operands further comprising:

means for providing a cross-invalidate (XI) signal for any other processor requesting to obtain control over a data unit that may be stored in the cache of the particular processor, a storage location EA for the data unit being provided with the XI signal;

means for comparing an EA in each entry in the OOST with the EA provided with the XI signal, and means for providing an XI hit signal if any EA in the OOST is found equal to the XI's EA; and means for invalidating all in entries OOST when any entry has an EA equal to the XI's EA.

* * * * *